United States Patent [19]

Koike et al.

[11] Patent Number: 5,659,410

[45] Date of Patent: Aug. 19, 1997

[54] SURFACE LIGHT SOURCE DEVICE AND LIQUID CRYSTAL DISPLAY

[75] Inventors: Yasuhiro Koike, Yokohama; Takayuki Arai, Kasukabe, both of Japan

[73] Assignee: Enplas Corporation, Kawaguchi, Japan

[21] Appl. No.: 362,955

[22] Filed: Dec. 23, 1994

[30] Foreign Application Priority Data

Dec. 28, 1993 [JP] Japan .................... 5-349478
Mar. 31, 1994 [JP] Japan .................... 6-083719

[51] Int. Cl.$^6$ ............................. G02F 1/1335
[52] U.S. Cl. .................. 349/82; 362/31; 362/349; 349/70
[58] Field of Search ............... 359/48, 49, 50; 362/31, 32, 26, 347, 349

[56] References Cited

U.S. PATENT DOCUMENTS

| | | | |
|---|---|---|---|
| 4,914,553 | 4/1990 | Hamada et al. | 362/32 |
| 5,055,978 | 10/1991 | Rogoff | 362/31 |
| 5,202,950 | 4/1993 | Arego et al. | 359/50 |
| 5,467,417 | 11/1995 | Nakamura | 362/32 |

FOREIGN PATENT DOCUMENTS

| | | | |
|---|---|---|---|
| 63-110423 | 8/1988 | Japan | 359/48 |
| 5-196939 | 8/1993 | Japan | 359/48 |
| 6-273751 | 4/1994 | Japan | 359/48 |

Primary Examiner—William L. Sikes
Assistant Examiner—Tiep H. Nguyen
Attorney, Agent, or Firm—Staas & Halsey

[57] ABSTRACT

A wedge shaped parallelized light flux element made of a light scattering guide of an emitting directionality has a specified ranged effective scattering irradiation parameter and correlation distance "a". A light incident into the parallelized light flux element from a fluorescent lamp arranged facing a light incident surface of the parallelized light flux element is emitted from a light output surface as a parallelized light flux G1 by composite factors including forward scattering of the inside, repeated reflection on wedge shaped two sides, critical angular condition and boundary face transmittance for the light output surface. A total amount of parallel light flux G1 emitted from the parallel light flux emitting section F is reflected on a two side prism surface of two prism reflection element PR thereby being converted into sectional area enlarged light fluxes G2 and G3. They are incident on a liquid crystal panel LP through a light diffusion plate DF, and utilized as a backlight. Reflective appearance of a light supply source for supplying a light to the light scattering guide is prevented by forming a reverse slope portion or the like on back surface of the light output surface in adjacent to the light incident surface of the parallelized light flux element.

20 Claims, 11 Drawing Sheets

SURFACE LIGHT SOURCE DEVICE AND LIQUID CRYSTAL DISPLAY

BACKGROUND OF THE INVENTION

I. Field of the Invention

This invention relates to a surface light source device using an optical element (hereinafter referred to as "a light scattering guide") having a function which guides a light while scatting the incident light in a volume region, and relates to a liquid crystal display device using said device as a backlight source.

In more detail, the invention relates to a surface light source device which converts a light from an ordinary type of light supply source such as fluorescent lamp or the like into a uniform light flux having an enlarged sectional area for emitting.

The surface light source device according to the invention is advantageously utilized not only for an application to backlight source of the liquid crystal display device as mentioned above but also for the application of the light flux having a relatively larger sectional area, in particular, for the optional application requiring parallel light fluxes having the relatively larger sectional area, and therefore this may advantageously be utilized for various kinds of such devices with the types using the surface light source devices for the purposes such as illumination, floodlighting, information transferring etc.

II. Description of the Related Art

Conventionally, heretofore known is various kinds of optical elements or devices of the types capable of emitting the light to the desirous direction by utilizing scattering phenomena, and being used for such as the backlight sources of the liquid crystal display.

One typical example of these known techniques include, for example, Japanese Patent Application Laid Opens Nos. Hei-2-13925 in 1990 and Hei-2-245787, wherein a surface shaped light source is formed in that a light source is arranged on lateral-side of an extending plate shaped transparent material, a reflecting element is disposed on a back surface-side thereof, and the vicinity of front-side surface has a light dispersing property and made to a light emitting surface.

In the surface shaped light source using such technique, it is difficult in principle to sufficiently raise the rate of scattering light taken out from the light scattering guide device because there does not arise the light scattering in volume inside the transparent member and spread in the light emitting direction is only kept by utilizing a diffusive reflection or a mirror reflection which is in adjacent to the surface of the transparent member or in the reflecting elements.

In case where the surface light source having a uniform illuminance is intended by the light incident from lateralside, as is easily understood from the examples in the Laid Open Document as described, some gradient is required for a reflective power of the reflection elements, this requires a complicated and larger sized construction for the light scattering guide device portion, it is therefore impossible to avoid a higher production cost.

Another similar type of the known technique is such that particle shaped substance having different refractive index from the transparent material is diffused into an extended plate shaped transparent member. This technique is considered to be superior to the first similar type of technique as described in a view point that a region having a volume spread has a scattering power to provide a directional conversion of the incident light to a direction of a light output surface. However, a problem still remains in that a particular countermeasure is needed in order to secure a uniformity of the brightness as a surface light source.

As an example, in Japanese Patent Application Laid opens Hei-2-221924, Hei-2-221925, and Hei-2-221926 each in 1990, a means is provided for enlarging a particle diameter and/or a particle concentration depending on an increase of distance from the light incident surface. However, it is difficult in technique to actually manufacture the light scattering guide having a gradient on the particle size or particle concentration. Such light scattering guide has disadvantageous and less productivity. For example, it is difficult to obtain a light scattering guide by one-time molding by applying an injection molding technique.

The present inventor has proposed a surface light source device having a uniformity of illuminance which is obtained using a light scattering guide with an tendency to reduce its thickness with an increase of distance from the light incident surface (Japanese Patent Application Hei-5-201990 in 1993). Such proposition is shown in FIG. 1 as one example of a basical structure of the surface light source device therealong.

For simplified explanation therefor, numeral 1 depicts a light scattering guide having a wedge shape, in adjacent of its light incident surface 2 is arranged a light source (a fluorescent lamp) L. A light emitting direction correcting element 4 having a line shaped prism surfaces 4a and 4b (its operation is described later) is disposed on a light output surface 5 side of the light scattering guide 1. A light flux 4f with a directionality having its flat surface 4e as a bright section is obtained. Arranging on upper portion thereof the known liquid crystal display device (called "a liquid crystal panel" depending on circumstances) composed of liquid crystal cell and other elements, thus a liquid crystal display is constituted.

Numeral 3 depicts a reflection means which is disposed opposing to a back surface 6 of the light scattering guide 1 and is made of a white sheet with a diffusive reflection property or a silver foil sheet with a regular reflection property.

In such surface light source device, a thickness of the light scattering guide 1 is more thinned with the increase of distance from the light incident surface 2 side, thus, due to a sloped surface repeating reflection effect which is arisen within the light scattering guide 1, a brightness level and a uniformity degree as a surface light source are considerably improved. A reason of obtaining such result is described as follows referring FIG. 2 which is a sectional view of a wedge shaped light scattering guide 1 and a reflector 3 used in an arrangement in FIG. 1.

Assuming that B0 represents a ray taken into the light scattering guide 1 from the light incident surface 2, then B0 is considered to form a small angle with a horizontal direction as shown in the drawing.

The behavior of this ray B0 is as follows. The ray B0, while receiving a change of direction due to scattering at a specified rate, repeats reflection on the light output surface 5 and the sloped surface 6 as shown in the drawing, and comes to the thin thickness portion of the light scattering guide 1. Reflections on the surfaces 5 and 6 are regular reflections, and an incident angle and a reflection angle on each reflection is as a matter of course equal to each other ($\theta_1, \theta_2, \theta_3 \ldots$), where, on attention to reflection on the light output surface 5, a relationship of $\theta_2 > \theta_4 > \theta_6$ is established.

In consideration of a boundary face transmittance on each reflection, a total reflection arises under the condition of θi>αc (a critical angle; 42° at PMMA—air boundary face), a transmittance rapidly rises on lowering of θi less than αc, and a transmittance comes substantially constant on θi equal to or less than a predetermined value (around 35° at PMMA—air boundary face). In the drawing, a situation of producing the emitting lights B4 and B6 by a relationship of θ2>θc>θ4>θ6 is shown.

Such effect is not limited to the representative ray B0 (non-scattering light), and the effect must similarly be produced as to a primary scattering light or a multi-scattering light, hence, as a whole of light scattering guide 1, it is considered to produce an effect that a light emitting rate from the light output surface 5 is more raised with the increase of a distance from the light incident surface 2. In evaluating this effect by a function f(x) of a distance "x" from the light incident surface 2, f(x) is an increase function relating to "x". On the other hand, in the vicinity of the light incident surface 2, an effect of being close to the light source 5 exerts on both of a direct light and a scattering light. This proximity effect is evaluated by g(x), then g(x) is a reduction function.

The proximity effect g(x) is canceled by f(x), thereby a tendency arising wherein a light is allowed to emit from the light output surface 5 after the light is introduced to a longer distance as much as possible. An opportunity, in which the light within the light scattering guide 1 is incident on the light output surface 5, is considered to increase as a whole by effect of the wedge shape, it can therefore be expected in effect that a brightness level itself is remarkably improved as a surface light source. In case of using one having a regular reflection property (silver foil sheet etc) as a reflector 3, a light transmitted through back surface of the light scattering guide i is not diffused and comes to more have a probability to be reincident into the light scattering guide 1, the effect as described above comes clearer accordingly.

In this way, by using a light scattering guide having an tendency to reduce a thickness with an increase of distance from the light incident surface, there may be constituted a surface light source device with an upgraded uniformity of the brightness and illuminance. However, even in such an improved type of surface light source device, a problem still remains in an tendency to generate a brightness irregularity of the surface light source mainly in an adjacent region to the light incident surface. According to consideration of the present inventor, the mechanism of producing such phenomenon is summarily explained referring to FIG. 3.

FIG. 3 shows an adjacent region of a light incident surface 2 in FIG. 2. A number of reflected rays having a smaller incident angle, such as being represented by rays C1 and C2, which travel forward and backward, are produced within the light scattering guide 1 in adjacent to the light incident surface 2 provided that a light source element L is not to emit only a parallel light flux vertical to the light incident surface 2 in case of arranging the light source element L in adjacent to the light incident surface 2 as a light supply means for supplying to the light scattering guide 1.

For example, now considering a specified ray C1 which enters to the light scattering guide 1 from the light incident surface 2 at a smaller incident angle and incident on a position R1 of a back surface 6 of the light scattering guide 1 at an incident angle $\phi_1$ without being scattered, then a part thereof is reflected on R1 to be towards the light output surface 5 side. In addition, although not shown in the drawing, a part of the light which has not been reflected on R1 is reflected on the reflector 3 and re-incident within the light scattering guide 1, and travels toward the light output surface 5 side through the same optical path.

An incident angle $\phi_2$ of a light which is incident on a position R2 to the light output surface 5 from the light scattering guide 1, decreases less than $\phi_1$ to approximates to 0° because of the sloped back surface 6 for the light output surface 5, and is largely reduced by an angle exceeding a critical angle (for example, approximately an extent of 42° in case of using acrylic resin on the light scattering guide 1). Therefore, most of the light is emitted from the light output surface 5.

As seen in the ray C2, the scattering light which contacts on a scattering center within the light scattering guide 1 (a refractive index ununiformity structure), has a strong forward scattering property as described later, and thus possesses a high probability to be incident on the back surface 6 of the light scattering guide 1 at a small incident angle. For this reason, the ray C2 is also reflected, on its both surfaces 5 and 6 and on the reflector 3 in the ray C1, thereby lights, which are mixed of a number of strong and weak lights as shown by C12 in the drawing, are emitted and produce a local ununiformity zone on brightness of the light output surface 5. In particular, on usage of one having a regular reflection property for the reflector 3, it will be of a high possibility to appear such ununiformity more notably.

Such brightness irregularity should be referred to as "reflective appearance phenomenon of the light source L in accordance with a regular reflecting phenomenon", accordingly hereinafter referred to simply as "reflective appearance".

On occurrence of the brightness irregularity due to the reflective appearance, the light output surface having a uniform brightness is substantially reduced and it is apparent that an extremely adverse effect practically occurs. For example, for application to the backlight source of liquid crystal display, it is not possible to avoid a countermeasure for shielding the light on the portion on which the brightness irregularity arises, thus, the size of display surface is limited correspondingly. A lowering of a light utilization efficiency deteriorates an electrical power saving characteristic.

One characteristic which is desired for the surface light source device is a directionality of an illumination light. For example, the surface light source device used for the backlight source of the liquid crystal display often requires a clear directionality in addition to a largeness of a sectional view of the illuminating light flux, a level of brightness or illuminance, a uniformity and so forth. This is in many cases because, in the liquid crystal display, the brightness of the display is of importance as to an observing direction in a limited range of a certain extent. In such a case, it is disadvantageous to use as a backlight the light flux (a light flux without having a parallel property) which is propagated in an excess wide angular range.

However, it has been difficult that a light emitted from the ordinary light source such as a fluorescent lamp or the like is converted into a uniform flux having a larger sectional area. For the known means for converting the light flux having a non-parallel property into a light flux with a high parallel degree, the optical system formed of lenses or a curved face mirror (a parabolic mirror etc) is well known. This light flux parallelization technique using the lens or the curved face mirror is to parallelize a light emitted in multi-direction from a non-parallel property flux source (a single number or a plural number of light source element(s) or an optical fiber emitting end or the like) by means of functions of light convergence or divergence which the lens or curved face mirror possesses.

Therefore, when the non-parallel property light flux emitting source has solely either one property of the divergence property (for example, a single point light source) or the convergence property (for example, a good number of directional point light sources arranged forward one point), then this comes to an effective parallelization means. However, it is difficult to parallelize the light flux which is difficult to regulate by one side property of divergence or convergence in case of the emitted light in multiple-directions from the light source having a spread property.

In using the optical system composed of the lens or concaved mirror, it is difficult in principle to flatten a profile of the parallelized light flux (the distribution of light intensity in the light flux sectional view; in most cases, the Gausian type profile having a peak in the vicinity of the optical axis is given), therefore this is not suitable for the application to obtain the parallelized light flux having a uniform light intensity.

Furthermore, in order to cause the lens or the curved face mirror to exhibit the light convergence/divergence function, a sufficient distance along an optical axis direction is required to be secured, thus miniaturization in a depth direction as a whole device is difficult in general, Heretofore known is the technique in that a light which is incident from lateral side by light scattering condition is emitted from the light output surface of the front surface-side as is the case of the surface light source devices described in Japanese Patent Application Laid Open Hei-4-145485 in 1990 and Japanese Utility Mode Registration Patent Application Laid Open Sho-51-89888 in 1978 in addition to the known documents (Japanese patent Application Laid Opens Hei-2-13925, Hei-2-245787, Hei-2-221924, Hei-2-221925, and Hei-2-221926 each in 1990).

However, those techniques are based on the conception such that a light amount emitted from the light output surface is secured through making a forward direction of the light to be random as much as possible by the light scattering function which is given to the inside of the light guide or to the surface region. Therefore, these known techniques do not intend to solve technical problems for obtaining the parallelized illuminating light from the surface light source device.

In this manner, conventionally, producing the parallelized light flux having a uniform profile, is in difficulty and consequently it is so difficult to secure a largeness of the light flux sectional area simultaneously in addition to the parallel degree of the light flux and uniformity of the profile.

OBJECT AND SUMMARY OF THE INVENTION

An object of the invention is to provide a surface light source device with a substantially high utilization efficiency of light capable of suppressing reflective appearance and obtaining a uniform brightness over a wide range by farther improving the already mentioned improved type of surface light source device using a light scattering guide. Another object of the invention is to provide a liquid crystal display without ununiformity of a display brightness by demonstrating such features of the surface light source device.

Further another object of the invention is to provide a surface light source device of an enlarged parallelized light flux type capable of converting the light flux from the light supply source into a parallelized illumineus flux having an enlarged sectional area.

More further another object of the invention is to provide a liquid crystal display which has a relatively larger display picture surface and is superior in a display brightness on observing from a predetermined direction in that a light source device of such an enlarged parallelized illuminous flux type is applied to a backlight source of the liquid crystal display.

Still another object of the invention is to provide a surface light source device capable of three dimensionally achieving an illuminous flux parallelization. Still further another object of the invention is adapted to relax and adjust an intensity of a luminous flux parallelization function of the surface light source device.

The present invention includes, by largely classifying, a first aspect and a second aspect. Those aspects may preferably be embodied each independently, or both at the same time. For convenience of the explanation, the invention is described separately in two aspects.

The first aspect of the invention provides an improvement in "A surface light source device comprising; a light scattering guide including, at least one relatively smaller light incident surface region, a relatively larger light output surface region for taking out an emitting light from the incident light as an origin, and a volume region having a uniform scattering power; and a light supply means for causing a light to be incident on the light incident surface region, in that the light scattering guide has, at least for a part thereof, a tendency in that, as viewed from the light incident surface region side, the thickness along a direction vertical to the light output surface region decreases with an increase of distance from the light incident surface region side".

According to the improvement, a reflective appearance prevention means for preventing "reflective appearance" of the light supply means is disposed on relatively near portion to the light supply means located opposite side to the light output surface region.

A light reflection means with a regular reflection property may preferably be disposed on opposite side to the light output surface region of the light scattering guide. In view of the light output surface region of the light scattering guide, a scattering light emitting direction correction means for correcting a scattering light emitting direction characteristic is provided in a unitary form or in a separated form with the light scattering guide, and a prior propagating direction of the illuminous flux obtained from the surface light source device is controlled.

Such a surface source device may be arranged on back surface-side of the liquid crystal display element as a backlight source, thereby providing a liquid crystal display with a superior display quality.

A second aspect of the invention uses a two side prism reflection element with a two-dimensional spread. A lateral side of the two side prism reflection element is disposed a parallel light flux emitting section for causing a parallelized light flux to be incident from a tilted direction for the two side prism reflection element, thereby constituting the surface light source device of an enlarged parallelized light flux type.

The parallel light flux emitting section includes a parallelized light flux element formed of the light scattering guide and the light supply means for supplying the light to the parallelized light flux element. The light scattering guide includes a volume region having a uniform scattering power in which the value of correlation distance "a" [μm] when a correlation function $\gamma(r)$ of a refractive index ununiformity structure producing the light scattering power is approximated by $\gamma(r) = \exp[-r/a]$ (where "r" represents a distance between two points within the light scattering guide) is within a range of $0.06 \leq a \leq 35$, and the value of effective scattering irradiation parameter value E [cm$^{-1}$] which is within a range of $0.5 \leq E \leq 50$.

The parallelized light flux element formed of the light scattering guide has at least one relatively smaller light incident surface region and a relatively larger light output surface region for taking out an emitted light having the incident light as an origin, and has, at least in one part thereof, a tendency that the thickness along the vertical direction to the light output surface region decreases with an increase of distance separated from the light incident surface region as view from the light incident surface region-side. The light supply means is arranged opposing to the light incident surface region of the light scattering guide.

In order to relax/adjust the parallelized light flux function of the surface light source device depending on requirement, a light diffusion plate may preferably be disposed in an optical path of a reflection light flux from the two side prism reflection element.

To correct a light emitting direction characteristic in a cross direction as viewed from the light incident surface-side of the parallelized light flux element, the light emitting direction correction means may preferably be provided faced on a light emitting surface of the parallelized light flux element.

Moreover, using a feature of the first aspect, a reflective appearance prevention means for preventing the reflective appearance of the light supply means may preferable be disposed on the relatively near portion to the light supply means on opposite side to a taken out side of the parallelized light flux of the parallel light flux element.

Such surface light source device may be disposed on back surface side of the liquid crystal display element as a backlight source, thus there can be provided a liquid crystal display having relatively larger display picture surface with a superior display quality.

In both first and second aspects of the invention, the light scattering guide having the volume region having a uniform scattering power is used, where a scattering characteristic of the light scattering guide will be described referring to the Debye theory with respect to a scattering irradiation parameter E and a correlation distance "a" both of which are used in the general description of scattering.

Considering that a light with an intensity I0 transmits through medium by "y" (cm), during which the intensity is attenuated to I due to then scattering, whereby at this time, an effective scattering irradiation parameter E is defined by the equations (1) and (2).

$$E \ [cm^{-1}]: \ -[\ln (I/I0)]/y \qquad (1)$$

$$E \ [cm^{-1}]: \ -(1/I) \ dI/dy \qquad (2)$$

The equations (1) and (2) are expressions of respectively so called an integration and a differential forms, and a physical meaning is equivalent. E is sometimes called as a turbidity depending on the circumstances.

On the other hand, an intensity of the scattering light when the light scattering arises by an irregularity structure distributed into medium is expressed by the following equation (3) in an ordinary case where most of emitting lights are vertical polarizing lights for the incident light of vertical polarizing light (Vv scattering).

$$Vv = [(4 <\eta^2> \pi^3)/\lambda_0^4] \, C \int_o^\infty \gamma(r) dr \qquad (3)$$

where $$C=[r^2\sin (\nu sr)]/\nu sr \qquad (4)$$

It is known that, when a natural light is incident, in consideration of Hh scattering, the equation (5) where the right edge of the equation (3) is multiplied by $(1+\cos^2\Phi)/2$ may preferably be considered.

$$Ivh=Vv(1+\cos^2\Phi)/2 \qquad (5)$$

Where $l_0$ represents a wavelength of an incident light, $\nu=(2\pi n)/\lambda_0$, and $s=2\sin (\Phi/2)$. Symbol "v" represents the refractive index of medium, $\Phi$ a scattering angle, $<\eta^2>$ a dielectric constant fluctuation root-mean-square of the medium (hereinafter, $<\eta^2>=\tau$ meets, where $\tau$ is suitably used), and g(r) a correlation function. The following equation (6) is satisfied.

$$\tau(r)=\exp (-r/a) \qquad (6)$$

According to Debye, when medium structure with an ununiform refractive index is separated into A phase and B phase by a boundary face, the equations (7) and (8) are established for a relationship between a correlation function $\gamma(r)$ and a correlation distance "a" and a dielectric constant fluctuation root-mean-square $\tau$.

$$a \ [cm]: \ (4\nu/s)\phi A \ \phi B \qquad (7)$$

$$\tau = \phi A \ \phi B \ (nA^2-nB^2)^2 \qquad (8)$$

where V; entire volume

S; entire area of boundary face $\phi A$, $\phi B$; volume percentage of A phase and B phase respectively.

nA, nB; refractive indices of A phase and B phase respectively.

Assume that the ununiform structure is formed on spherical boundary face having a radius R, then the correlation distance "a" is expressed in the following equation (9).

$$a \ [cm]=(4/3)R \ (1-\phi A) \qquad (9)$$

Using the equation (6) in relation to a correlation function $\gamma(r)$, an effective scattering irradiation parameter E at the time that the natural light is incident on the medium in accordance with the equation (5) is calculated, thereby the result comes to the following.

$$E=[(32a^{3\pi 4})/\lambda 0^4]f(b) \qquad (10)$$

where $$f(b)=[\{(b+2)^2/b^2(b+1)\}-\{2(b+2)/b^3\}\ln(b+1)] \qquad (11)$$

$$b=4\nu^2 a^2 \qquad (12)$$

are satisfied.

In the relationship as described above, it is understood that a correlation distance "a" and a dielectric constant fluctuation root-mean-square n are varied and this thereby enables to control a scattering light intensity, an angular dependency of the scattering light intensity, and the effective scattering irradiation parameter E.

FIG. 4 shows, in case of E=50 [cm$^{-1}$] and E=100 [cm$^{-1}$], a characteristic curve with horizontal axis of a correlation distance "a" and vertical axis of a dielectric constant fluctuation root-mean-square τ, expressing a condition of making the effective scattering irradiation parameter E constant.

In general, a larger value ore expresses a stronger scattering power, and to the contrary, a smaller E provides a weaker scattering power, in other words, this designates to approximate a transparent state. E=0 represents a state entirely without scattering.

Therefore in general, the light scattering guide having a smaller value of E is employed for a large scaled light scattering guide, and the light scattering guide having a larger value of E is employed for a smaller scaled surface light source device.

In the second aspect using the light scattering guide as a parallelized light flux element, considering an ordinary dimension display, an effective irradiation parameter E of the light scattering guide may preferably be in a range of 0.5 to 50 $[cm^{-1}]$.

On the other hand, a correlation distance "a" is a quantity which is deeply related to a directionality of the scattering light in the individual scattering phenomena inside the light scattering guide. As is estimated in the forms of the equations (3) and (5), the light scattering in the light scattering guide is generally of a forward scattering property, however the intensity of the forward scattering property varies depending on a correlation distance "a".

In FIG. 5, such is exemplified for two values of "a" by a graphical representation. In the drawing, horizontal axis expresses a scattering angle Φ (a forwarding direction of an incident light is made Φ=0°) and vertical axis expresses a standardized scattering light intensity in assuming the natural light, this designates Vvh(Φ)/Vvh (0) that is a value where the equation (5) is normalized for Φ=0°.

As written together in the drawing, in case of a=0.13 μm, that is, when 2R=0.2 μm is satisfied by a particle size conversion value by the equation (9), then a graph expressing a relaxed reduction function in relation to Φ is obtained. In contrast to this, and in case of a=1.3 μm, that is, 2R=2.0 μm by a particle size conversion value by the equation (9), there can thus be obtained a graph expressing a function which is rapidly decreased within a region where Φ is within a smaller value.

In this way, the scattering produced by an irregularity structure of a refractive index within the light scattering guide shows basically a forward scattering property, which is weakened with a reduced value of the correlation distance "a", and a scattering angular range in the individual scattering processes tends to be spread. This has already been confirmed by an experimentation.

The foregoing argument is established only when aiming at the scattering phenomenon itself by a refractive index irregularity structure which is distributed inside the light scattering guide. On the other hand, in order to evaluate a directional characteristic of the light actually emitted from the light output surface of the light scattering guide or the parallelized light flux element, it is required to consider simultaneously the phenomena of "a total reflection" and "a transmittance at the time of light emitting (escape factor from the light scattering guide)" on the light output surface.

The total reflection condition which is well known as a basical optics theory being applied to the light scattering guide, if a light is incident on the light output surface from the inner-side of the light scattering guide under the condition that the incident angle exceeds a critical angle αc (here, a direction of a normal erected on the light output surface is made 0°) which is determined by refractive indexes of the medium inside and outside the light scattering guide, as immediately understood, the emitting (escape) to the external (air layer) does not arise.

A value αc=42° is given in case of PMMA (polymethylmethacrylate; a refractive index 1.492), which is a representative material employed in the light scattering guide according to the invention. As described later, a refraction index in a range of 1.4–1.7 is given for an ordinary resin material, including PMMA, which is suitable used as a matrix material of the light scattering guide according to the invention. Thus, a range of a practical value of αc corresponding to the above is calculated to be in a range of an extent of 36.0° to 45.6°.

As described above, the scattering within the light scattering guide exhibits a forward scattering property, in an ordinary case where a light incident surface is placed on a lateral-side of the light Output surface, it is considered as a rare case that the light incident from the light incident surface encounters with the irregularity structure to produce a primary scattering light which immediately satisfies the critical angle condition described above.

Therefore, it is should be considered that, most of the lights emitted from the light output surface, after passing through a multiple scattering process within the light scattering guide or a reflection process on a boundary face on back surface-side of the light scattering guide or another reflection process by a reflector arranged thereon, satisfy the critical angular condition to be emitted to the external.

If such is the case, with an attention to such light satisfying the critical angle condition (a escape condition from the light scattering guide), the forward scattering property which is an attribute of the individual scattering phenomenon is made unclear to a certain extent, and a good amount of spread must be produced in the light forwarding direction distribution. As a result, a directionality characteristic of the light emitted from the scattering light guide and the parallelized light flux element come to largely depend on an angular dependency of a transmittance (an escaping factor) in the light output surface of the light satisfying the critical angle condition.

In general, it is known that a boundary surface transmittance of the light incident on a medium boundary surface with an incident angle as satisfying the critical angle condition at a most limited condition, is extremely low. For example, in case of a boundary face between acrylic resin and the air, a transmittance on a boundary face for P polarized component is around 40%, and the same for S polarized component is around 20%. With the increase of the amount of angle by which an incident angle lowers from the critical angle, then a light transmittance is rapidly increased, and when lowered by equal to or more than 5° to 10°, a boundary face transmittance comes to substantially constant. For example, in the boundary face between the acrylic resin and the air, under such condition, a boundary face transmittance of the P polarized light component is equal to or more than 90%, and the same of the S polarized light component is equal to or more than 85%.

From these phenomena, arguing the acrylic resin case, the light with an incident angle of about 35° to 40° to the light output surface is determined to most largely contribute to the light emission from the light output surface of the light scattering guide or the parallelized light flux element. Now considering relating to Snell's law relating to the refractive index, when the light output surface is a boundary face between the acrylic resin and the air, a light incident on the light output surface with an incident angle of about 35° to 40° is emitted in a direction where resultantly the emitted light travels and enters into a range of an extent of several degrees more or less than about 65° for a normal line erected on the light output surface from the air-side.

When a material other than acrylic resin is used for a matrix of the light scattering guide, a refractive index of an actual material is in a range of about 1.4 to 1.7, thus if a shift of extent of several degrees is estimated for the angle as formerly described, entirely the same argument is established.

A emitting light from the light output surface of the light scattering guide or the parallelized light flux element comes, by roughly estimating, to have a directionality in a direction rising more or less approximately by 20° to 30° for a surface the light output surface.

Here, it is however noted that too smaller value of correlation distance "a" provides a weakened forward scattering property in the individual scattering process, and generates the scattering light with a larger range including a backward scattering only by the primary scattering. In such case, a prior condition that gives such directionality to a light emitted from the light scattering guide will be broken.

According to the invention, the light scattering guide with an emitting directionality may preferably be used depending on a directionality of illuminous light which is desired for the surface light source device. In particular, the parallelized light flux element used in the second aspect of the invention means one which positively employs as a light flux parallelization means the light scattering guide (hereinafter referred to as "light scattering guide with an emitting directionality") capable of preventing the phenomenon such as described above from being intensive.

In the light scattering guide constituting the parallelized light flux element, a lower limit value of a correlation distance "a" is around 0.06 µm. In considering this condition, 0.06 µm to 35 µm is determined as one preferable range which is given to the correlation distance value "a" of the light scattering guide used in the second aspect of the invention. In using the light scattering guide with different refractive index particles being diffused into resin matrix, a range of the particle size value of the different refractive index particles in response to this condition is calculated to be 0.1 µm to 54 µm by the equation (9).

In the first aspect of the invention, the light scattering guide is not always required to have a strong emitting directionality. However in the first aspect, at least a certain extent of emitting directionality may preferably be possessed by the light scattering guide. A range of 0.01 µm to 35 µm is proposed for one of the practical ranges with respect to a correlation distance "a" which conforms to the reference described above.

In general, the "reflective appearance" effect described in the related explanation of FIG. 3 tends to intensively appear with the increased emitting directionality of the light scattering guide. However, the reflective appearance effect is suppressed by presence of the reflective appearance prevention means which is a feature of the first aspect of the invention.

In case of arranging the reflector of the regular reflection property on back surface-side of the light scattering guide, the emitting directionality of the light scattering guide may preferably be clear in order to improve a uniformity of the brightness through exhibiting a reflection effect due to the regular reflection property.

Similarly, when arranging the light emitting direction correction means on the light output surface-side, the emitting directionality of the light scattering guide may preferably be clear in order to exhibit an effect of the light emitting direction correction by the light emitting direction correction means.

The light emitted from the light output surface of the light scattering guide or the parallelized light flux element has, as described above, a directionality in a rising direction of approximately 20° to 30° for a light output surface. However, when applying the surface light source device to the backlight source of the liquid crystal display, the sometimes required is a brightness as viewed from a front direction or a tilted direction thereadjacent. A sectional area of the parallel light flux emitted from the light output surface of the parallelized light flux element is not made enlarged than that of the light output surface, then for requirement of relatively larger sectional area of the light flux, a size of the parallelized light flux element must be made a larger size to meet such requirement.

In the second aspect of the invention, in order to avoid such drawback, a parallel light flux emitted from the parallelized light flux element is reflected on a reflection surface of the two side prism reflection element which is arranged obliquely for a propagating direction of the parallel light flux, hence, the propagating direction of the parallel light flux is converted to a predetermined direction, for example, the vertical direction for an extending direction of the surface light source device as a whole (hereinafter referred to simply as "a front direction"), and at the same time of the above, a sectional area of the light flux is enlarged.

The explanation as listed below will be described in detail in the embodiment, namely, (1) how to make concrete the light emitting direction correcting means used in the first and second aspects, (2) how to make concrete the reflective appearance prevention means in the first aspect, (3) a shape of a reflection surface and a selection of an arrangement direction of the two side prism reflection element, or an enlarging function of the parallel light flux which each is used for the second aspect, (4) material or manufacturing method and so forth of the light scattering guide used for the first and second aspects.

DETAILED DESCRIPTION OF THE PREFERRED EMBODIMENT

Figure 6:
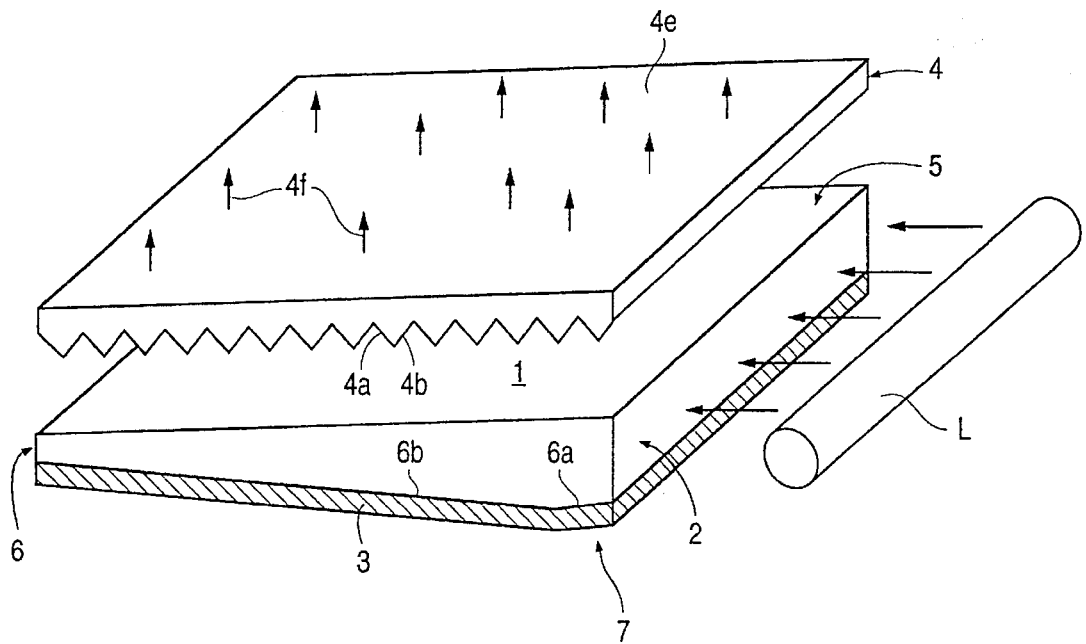
FIG. 6 is a perspective view illustrating one embodiment in a first aspect of the invention.

FIG. 6 is a perspective view illustrating one embodiment in the first aspect of the invention. In FIG. 6, numeral 1 depicts a substantially wedge shaped light scattering guide, on its thick thickness-side end surface is provided, in a manner of facing thereto, with a light source (a fluorescent lamp) L. A light supplied from the light source (fluorescent lamp) L is incident leftward from a light incident surface 2, and taken out from a light output surface 5. A light emitting direction correcting element 4 provided with a line shaped prism surfaces 4a and 4b is arranged as a light emitting direction correcting means on outer-side of the light output surface 5. A flat surface 4e of the light emitting direction correcting element 4 is made a surface light source, thereby a light flux 4f with a directionality is obtained.

A shape of the light scattering guide 1 has a tendency such that, generally at least in a part thereof, a thickness along the vertical direction to the light output surface is reduced with an increase of distance from the light incident surface as viewed from the light incident surface-side. The substantially wedge like shape in the present embodiment is a typical example of such.

An upper-side thereof is arranged thereon further with the known liquid crystal display device, thus, a liquid crystal display using the light flux 4f as a backlight is produced.

A silver foil sheet 3 of a regular reflection property is disposed along a back surface 6. A reflection means arranged opposing to the back surface 6 may be a plate shaped member (for example, a white sheet) of a diffusive reflection property. However, it is preferable that the surface light source is allowed to have a directionality, and in order to raise a brightness viewed from a required direction, one with a regular reflection property may preferably be utilized. The reason is listed as in the next paragraph.

An arrangement of the white sheet etc on a back surface-side of the light scattering guide 1 provides a more random of light forward direction distribution (scramble effect) in the light scattering guide 1, an effect of transferring in the long distance the light on a tilted surface 6b portion is weakened, and simultaneously an emitting directionality of the light scattering guide 1 is deteriorated. This is not preferable in maintaining a brightness uniformity as a surface light source, in addition to this, a relative deterioration arises for an effectiveness of the light emitting direction correcting means using a refractive index due to a prism surface which will be described in next. Therefore, in view of such, the reflector 3 having a regular reflection property may advantageously be utilized.

In this way, the arrangement of the reflector of regular reflection property on back surface-side of the light scattering guide provides the advantage as described, on the other hand, this cases more easily generating reflective appearance in the vicinity of the light incident surface 2. Thus, a reflective appearance prevention means 7 for preventing the reflective appearance of the light source L is provided on an adjacent region of the light incident surface 2 on back surface-side of the light scattering guide 1 in accordance with a technical concept of the invention. In this example, the reflective appearance prevention means 7 is realized as seen in a reverse tilt portion 6a.

Figure 1:
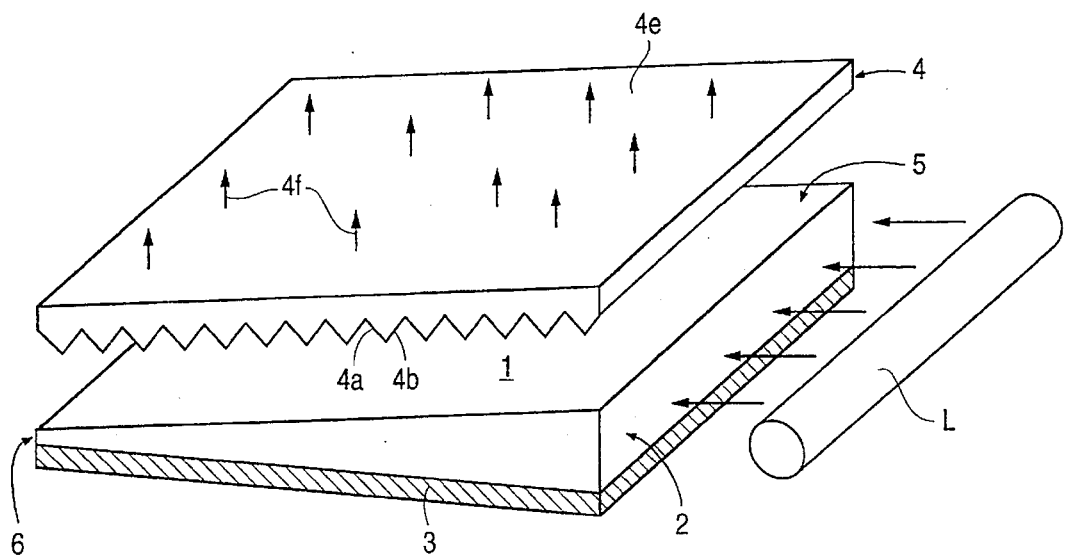
FIG. 1 is a schematic view of one example of a basical constitution of a surface light source device of an improved type in the conventional example which uses the light scattering guide tending to reduce its thickness with the increase of distance from a light incident surface.
Figure 2:
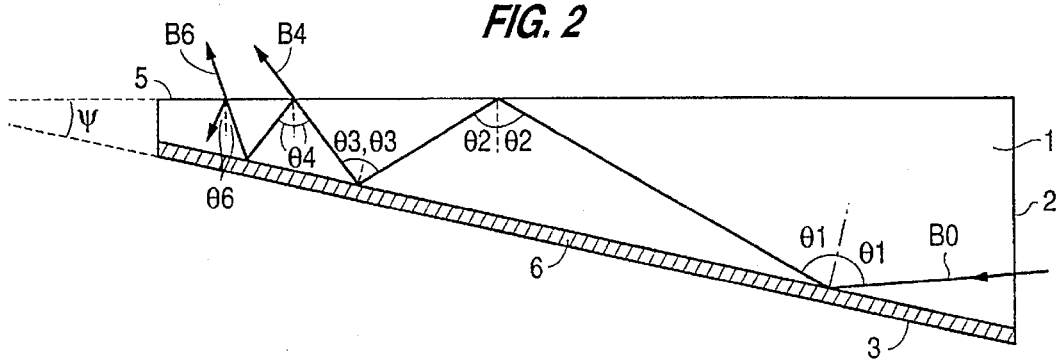
FIG. 2 is an illustrative view for illustrating a repeated reflection effect when a thickness of a light scattering guide is more thinned with an increase of distance from a light incident surface side.

The back surface 6 of the light scattering guide 1 has, differing from the structure in FIG. 1, a tendency that a thickness of the light scattering guide 1 increases with an increase of distance from the light incident surface 2 in a back surface portion 6a adjacent to the light incident surface 2, and a tendency that to the contrary a thickness of the light scattering guide 1 decreases with the increase of distance from the light incident surface 2 in the remaining portion 6b.

Figure 3:
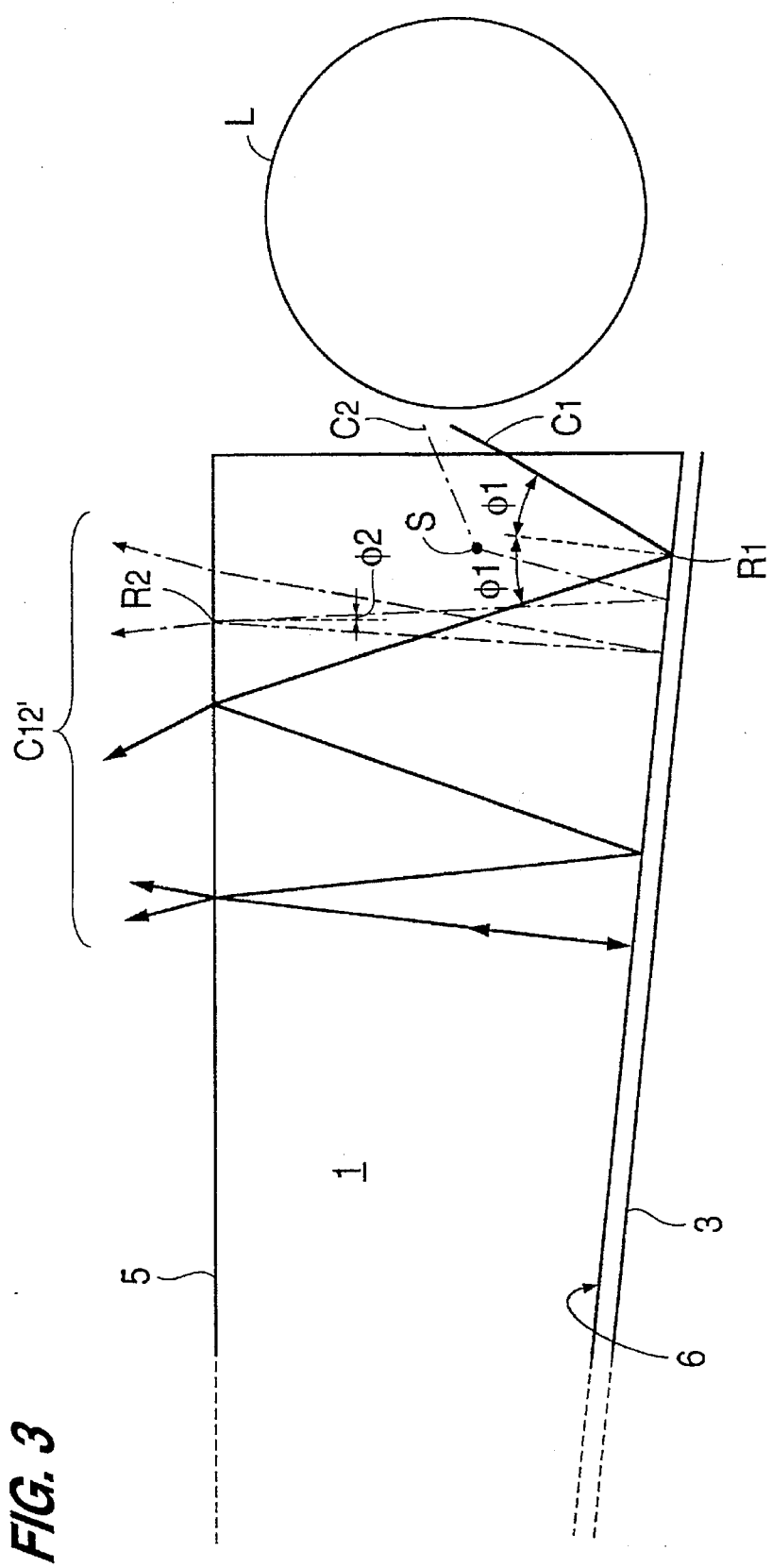
FIG. 3 is a partial illustrative view showing an adjacent region of a light incident surface in FIG. 2 in order to illustrate a reflecting phenomenon of a light source.
Figure 4:
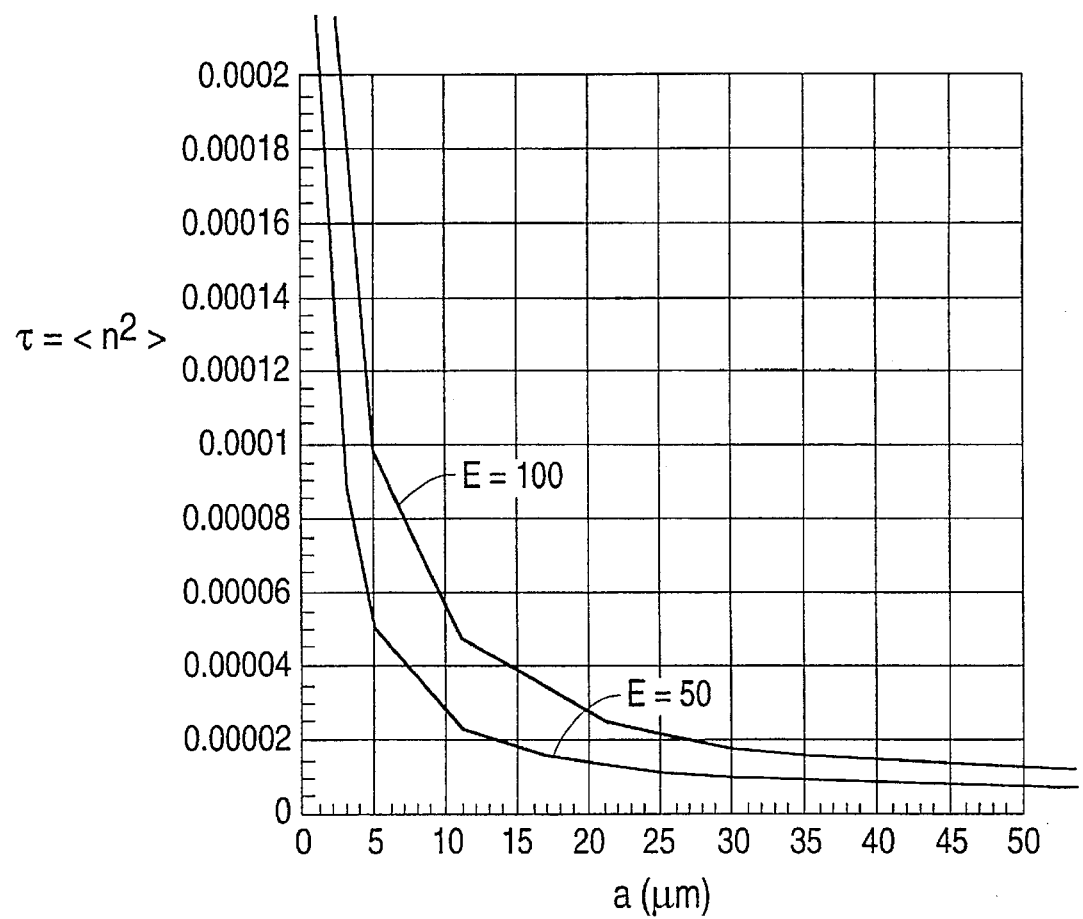
FIG. 4 is a graphical representation showing a condition that an effective scattering irradiation parameter E is made constant in horizontal axis of correlation distance "a" and vertical axis of dielectric constant fluctuation root-mean-square in respect of a condition of E=50 [cm$^{-1}$] and E=100 [cm$^{-1}$]
Figure 5:
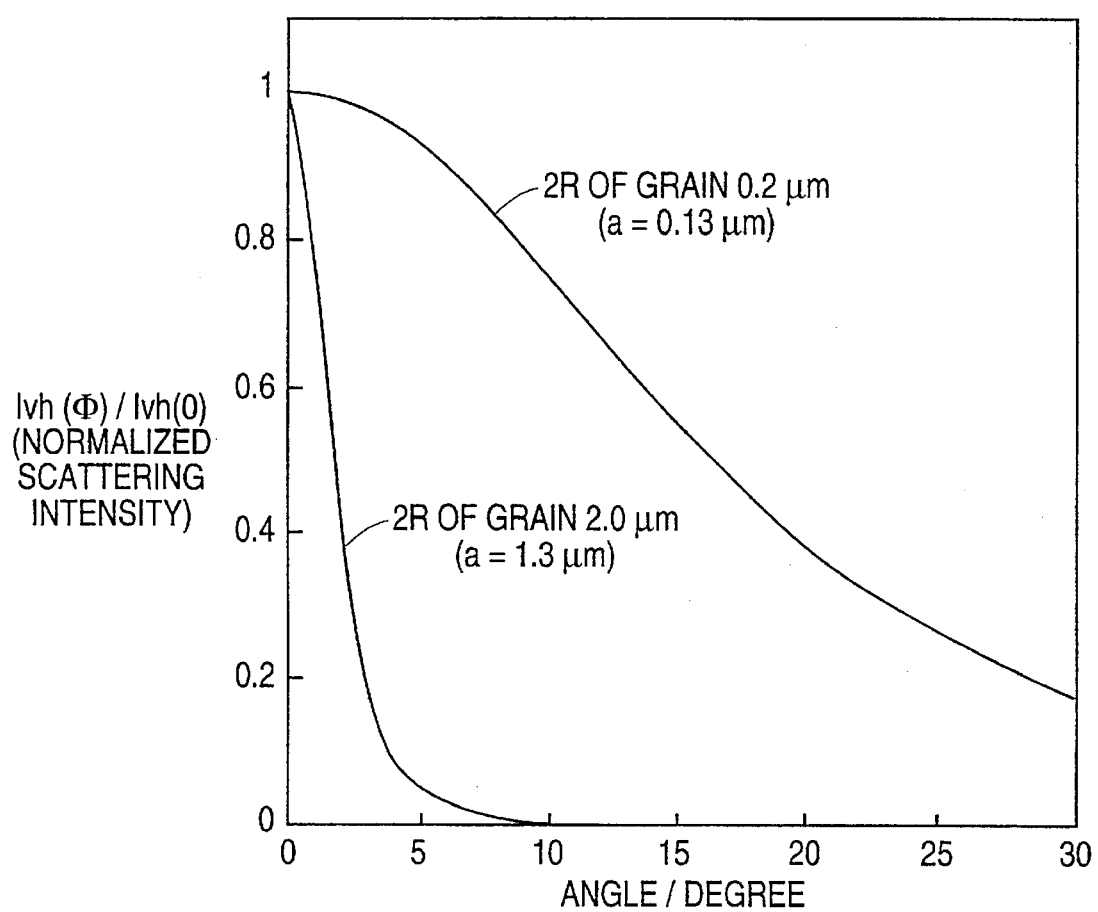
FIG. 5 is a graphical representation illustrating variation of intensity of a forward scattering property of a light scattering guide depending on a correlation distance "a"
Figure 7:
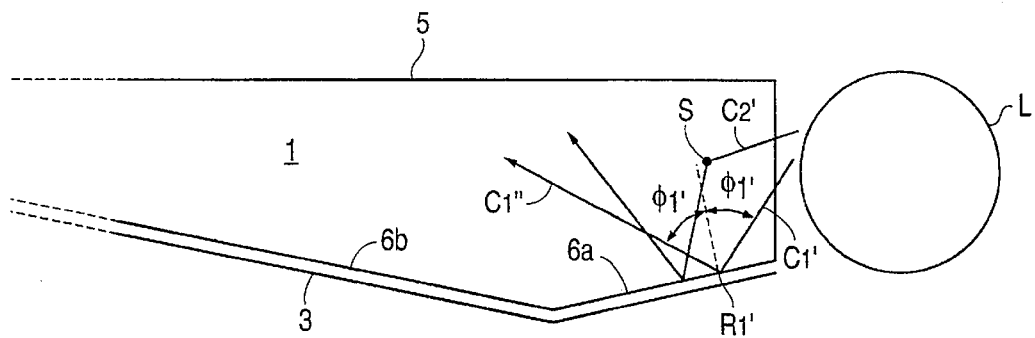
FIG. 7 is an illustrative view showing the reflective appearance prevention operation of a reflective appearance prevention means, and exemplifying a behavior of a light in adjacent of a light incident surface under a condition conforming to FIG. 3.

FIG. 7 is an illustrative view showing the reflective appearance preventing operation of a reflective appearance prevention means, exemplifying a behavior of a light in the vicinity of a light incident surface 2 under the same condition as in FIG. 3.

A ray C1' corresponding to a ray C1 in FIG. 3 is incident on the light scattering guide 1, thereafter positively reflected on the reverse tilt portion 6a (an incident angle and a reflection angle are together $\phi1'$). Thus, differing from case in FIG. 3, a ray C1" after being reflected travels in a direction which directs a relatively long distance, and does not travel to an angular direction which crosses orthogonally with the light output surface 5. As a result, by the ray C1' represented by such optical path, a possibility to generate such reflective appearance of the light source L in adjacent to the light incident surface 2 comes considerably rare.

As seen in the ray C2', a cause of the reflective appearance hardly arises as to the ray C2' which is scattered on a scattering center (a refractive index irregularity structure) of the light scattering guide 1 and thereafter is incident at a small incident angle on the reversely sloped portion 6a of back surface 6 of the light scattering guide 1.

The same argument is established for the incident light on the reflector 3 transmitting through the reversely sloped portion 6a. Finally, this reversely sloped portion exhibits a reflective appearance preventing function including an effect of reflection on the reflector 3.

The reflective appearance preventing function is effectively present, as is apparent from its mechanism in the explanation above, even in either type of a diffusion property or a regular reflection property of the reflector 3, or even when the reflector is not disposed. In particular, the fact that one having a regular reflection property may be used as a reflector 3 without paying attention as to the reflective appearance of the light source L, is advantageous in effectively utilizing operation of the light emitting direction correcting means (the light emitting direction correcting element 4 in this embodiment) as described in the following paragraph.

Figure 8:
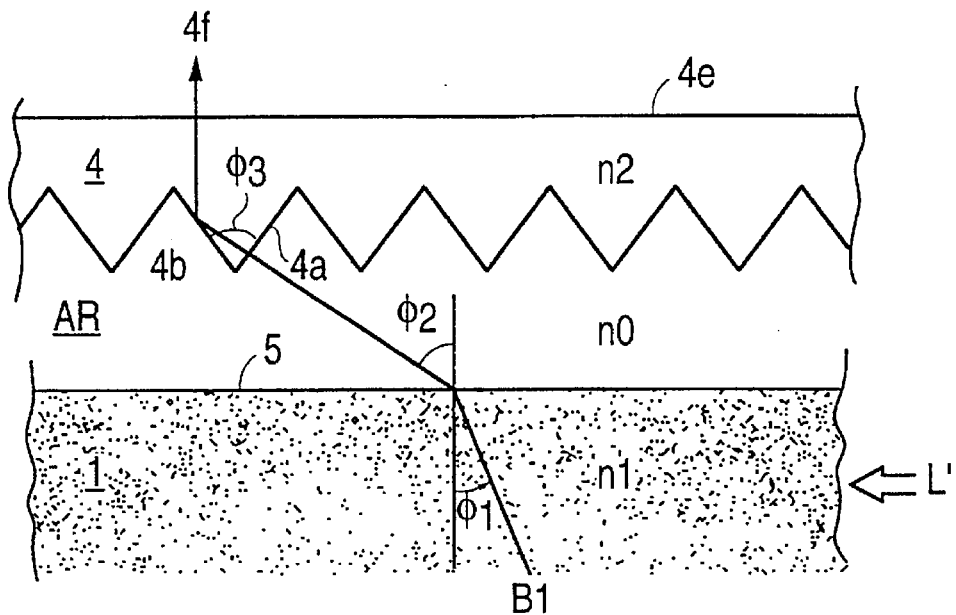
FIG. 8 is a sectional view illustrating a behavior of a light in case where a light emitting direction correcting element in an arrangement in FIG. 6 is arranged facing a light output surface-side of a light scattering guide with its prism surface toward inside thereof.
Figure 9:
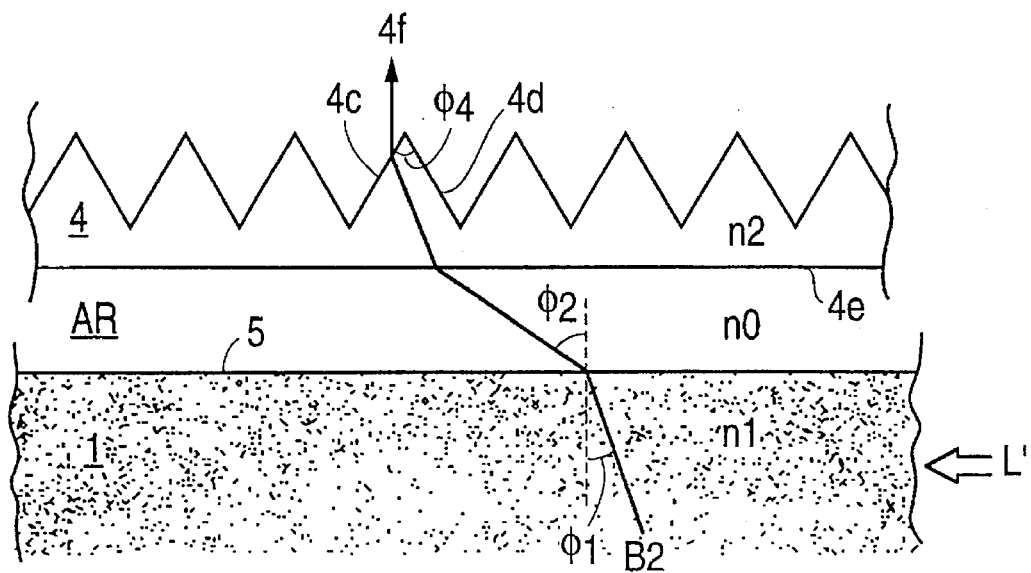
FIG. 9 is a sectional view illustrating a behavior of a light in case where a light emitting direction correcting element in an arrangement in FIG. 8 is arranged with its prism surface toward outside thereof.
Figure 10A:
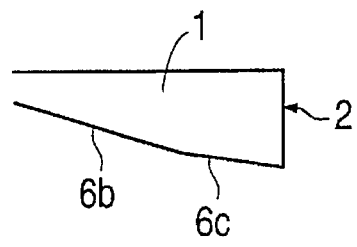
FIG. 10 shows, in a sectional view of several light scattering guides, several modified examples of a reflective appearance prevention means; namely, in (a) of the drawing, a flat surface portion relaxing a tilt is provided in adjacent to a light incident surface; in (b), a flat portion in parallel with a light output surface is provided in adjacent to a light incident surface; in (c), a whole back surface of a light scattering guide is made a curved surface and its tilt is gradually relaxed with decreased distance to a light incident surface to resultantly prevent a reflecting; in (d), a flat portion in parallel with a light output surface is provided in adjacent to a light incident surface and a remaining portion is made a curved surface; and in (e), a reverse tilt curved Portion is provided in adjacent to a light incident surface and adapted to smoothly move to a flat shaped tilt portion.
Figure 10B:
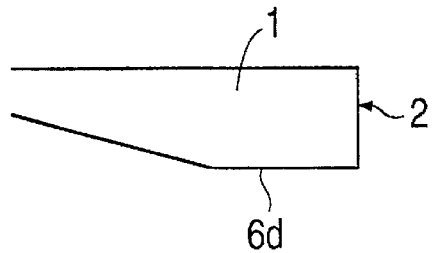
Figure 10C:
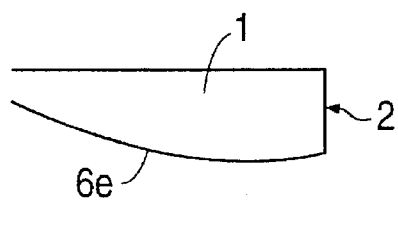
Figure 10D:
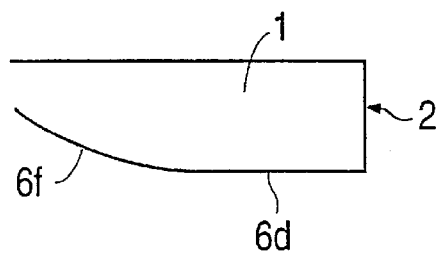
Figure 10E:
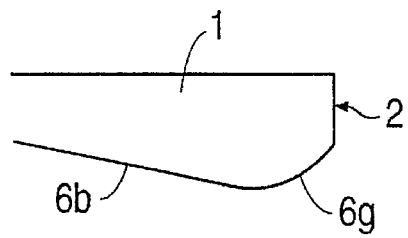

An operation of the light emitting direction correcting element 4 in the embodiment in FIG. 6 is described referring to FIGS. 8 and 9. In the drawings, the light scattering guide 1 uses polymethylmethacrylate (PMMA; a refractive index n1=1.492) as the matrix, the light emitting direction correcting element 4 is made of polycarbonate (PC; refractive index n2=1.59).

FIG. 8 is a sectional view showing a behavior of a light in an arrangement in FIG. 6. In the drawing, the light emitting direction correcting element 4 is disposed, facing the light output surface 5 side of the light scattering guide 1, in a manner of directing its prism surface toward the inside.

Assuming that a light incident direction is as arrow mark L', then as described in the operation, a representative ray B1 satisfying a critical angular condition is incident on the light output surface 5 with an angle of approximately $\psi1=35°$, most of them are emitted to the air layer AR. An emitting angle $\psi2$ at this time is equal to around 60° where a refractive index n1 of the light scattering guide 1 is n1 =1.492 and a refractive index n0 of the air layer AR is n0 =1.

The representative ray B1 is, after straightway traveling through the air layer AR, incident at an angle approximating a right angle on the prism surface 4a of the light emitting direction correcting element 4. Particularly, if a vertical angle $\psi3$ of the prism surface is approximately $\psi3=80°$, a satisfying degree of this condition is high (a rate of being incident on the prism surface 4b on opposite side is relatively smaller). Accordingly, the representative ray B1 straightway travels up to the prism surface 4b on opposite-side to be positively reflected, to be incident at an angle approximating a vertical direction for the flat surface 4e of the light emitting direction correcting element 4, and then to be emitted from the ray emitting direction correcting element 4.

FIG. 9 is a sectional view illustrating a behavior of a light in case where a light emitting direction correcting element 4 in an arrangement in FIG. 6 is disposed with its prism surface being directed toward the external.

If a light incident direction is as arrow mark L', then as described in case of FIG. 8, a representative ray B2 satisfying a critical angular condition is incident on the light output surface 5 with an angle of approximately $\psi1=35°$, most of them are emitted to the air layer AR. An emitting angle $\psi2$ at this time comes equal to around 60°.

The representative ray B2 is, after straightway traveling through the air layer AR, incident obliquely on the flat surface 4e of the light emitting direction correcting element 4, and travels on a refractive path as shown in the drawing to be emitted from the surface 4c of the light emitting direction correcting element 4 at an angle approximating the vertical direction for the light output surface 5 (a rate of being emitted from surface 4d is relatively smaller).

The optical path of the light on and after being incident on the flat surface 4e of the light emitting direction correcting element 4 is varied in a wide range with changes of a refractive index n2 and prism vertical angle $\psi4$ of the light emitting direction correcting element 4, thus, the light having a directionality to a desirous direction can be obtained through selecting these parameters.

Any of light emitting direction correcting element 4 may preferably be employed without limiting to one formed thereon of a train shaped prism-surface as shown in the drawing. For example, it may be considered to employ films in which triangular cone shaped or dome shaped protrusion groups are distributed, or to employ plate shaped elements having line shaped convexes with a semicylindrical shaped sectional view, or the like.

For a particular case, for example, there can be employed a modification wherein, by means of previously forming irregularity surfaces on metallic die when manufacturing the light scattering guide 1 using an injection molding technique, the light output surface 5 is formed of the irregularity, and then allowed to act as a light emitting direction correcting element.

Such is the function of the light emitting direction correcting element, however if the rays B1 and B2 in FIGS. 8 and 9 is provided under the condition in which they more clearly represent the light emitted from the light scattering guide 1, the effectiveness of the light emitting direction correcting function is extremely raised and a brightness viewed from the emitting direction of the representative ray is noticeably improved. It has been confirmed by experimentation that the situation as described can be realized by arranging the light reflection means 3 of a regular reflection property on a back surface-side of the light scattering guide 1.

In the foregoing, the embodiment has been described wherein the reversely sloped portion 6a is formed on back surface (a surface opposite-side to the light output surface) of the light scattering guide 1 as a reflective appearance prevention means. However, the reflective appearance prevention means according to the invention is not limited to such reversely sloped portions. According to the invention, the reflective appearance are caused by operation that a positively reflected light on back surface-side of the light scattering guide 1 in adjacent to the light incident surface 2 travels towards the light incident surface 5 at a smaller incident angle, whereby the reflective appearance prevention function is achieved by relaxing or flattening a tilt for the light output surface 5 on back surface 6 adjacent to the light incident surface 2.

FIG. 10(a) to 10(e) shows several modifications of the invention in sectional views of a light scattering guide 1. Either one of the examples exhibits the reflective appearance prevention function by the same operation as in the embodiment hereinbefore described. In (a) of FIG. 10, a flat surface portion 6c with relaxed sloped surface is provided in adjacent to the light incident surface 2, in (b) a flat surface portion 6d in parallel with the light output surface 5 is provided in adjacent to the light incident surface 2, in (c) a whole back surface of the light scattering guide 1 is made a curved surface 6e, a tilt of which is more relaxed with a reduced distance from the light incident surface 2, in (d) a vicinity of the light incident surface 2 is provided thereon with a flat surface portion 6d in parallel with the light output surface 5, and the remaining portion is made a curved surface 6f, and in (e) a vicinity of the light incident surface 2 is provided thereon with a reversely sloped curved portion 6g, and a smooth transfer to the flat shaped sloped portion 6b is adapted to be achieved.

The reflective appearance prevention function can be improved in that all or a part of reflective appearance prevention portion 6a, 6c, 6d, and 6e each in FIG. 6 or 10 are made a rough surface in addition to a thickness variation of the light scattering guide. Similarly, in the reflector arranged on back surface-side of the light scattering guide 1, such function is more effective when a portion corresponding to each reflective appearance prevention portion thereof is given of a decreased regular reflection property and made to have a diffusion reflection property. The reflective appearance preventing function can be enhanced, in the vicinity of the light incident surface, by reducing a reflectivity of the reflector having a regular reflection property, or by placing a portion where no reflector is disposed.

As an example of the reflector having a regular reflection property, a sheet on which a reflection film such as aluminum film or the like is vapor deposited on a substrate is proposed in addition to silver foil. On manufacturing the light scattering guide (see a manufacturing method described below), these silver foil or aluminum foil may preferably be fixed on back surface 6 of the light scattering guide by an in-mold molding method.

Figure 11A:
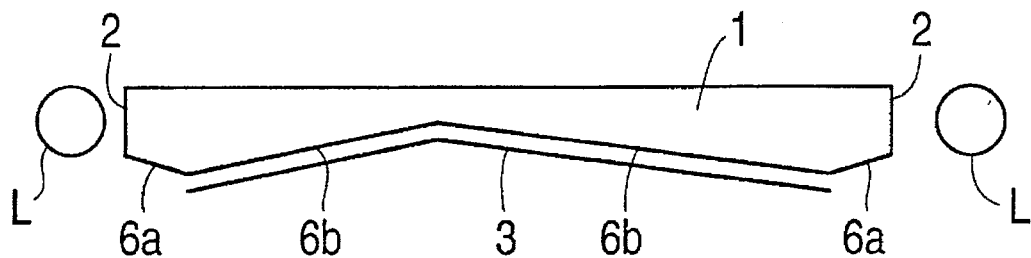
FIGS. 11(a), 11(b) and 11(c) show a possible modified example in a shape and an arrangement of a light scattering guide and a light source (a light supply means) in the first aspect of the invention.
Figure 11B:
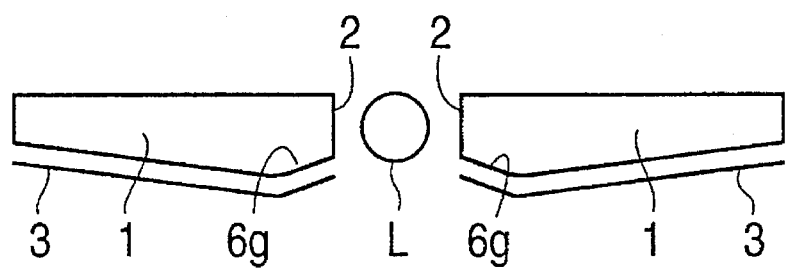
Figure 11C:
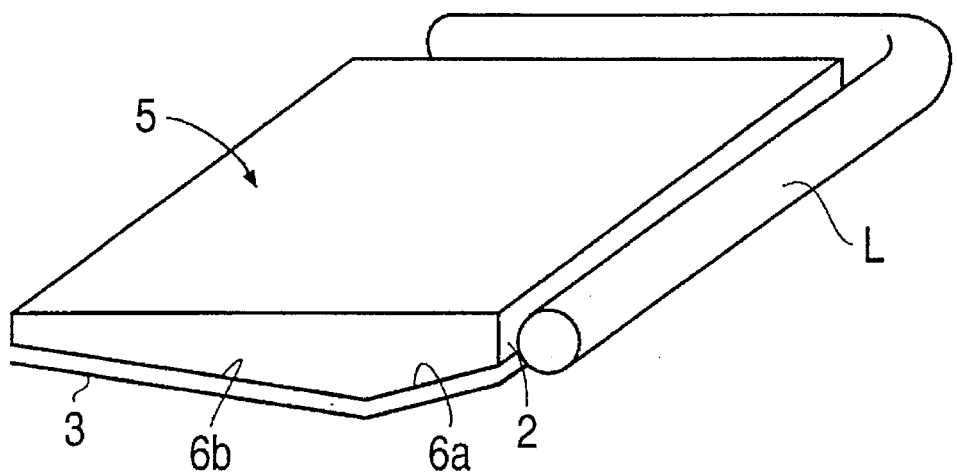

Also for the shape and light source (light supply means) of the light scattering guide, ones shown in FIG. 6 and FIG. 10 are solely representative. Therefore, the present invention is not limited to such embodiments. FIGS. 11(a), 11(b) and 11(c) exemplify possible several modification examples and arrangements.

In FIG. 11(a), two substantially wedge shaped light scattering guides formed therein of the reflective appearance prevention portion 6a are allowed to contact with each other and arranged adjacent to the light incident surface. 2. The silver foil 3 is arranged along only the semi-normally-sloped portion 6b, the light sources L, L are arranged on both side surfaces.

In FIG. 11(b), one light source L is used to supply the light commonly to both of two light scattering guides 1 and 1'. The reflective appearance prevention is achieved by forming the curved portion 6g on both of light scattering guides 1 and 1'.

In FIG. 11(c), using a bent fluorescent lamp L, a light is allowed to be incident from the two light incident surfaces 2 (one-side is shown) of the light scattering guide 1 whose thickness varies in a two dimensional manner. The reflective appearance prevention is achieved by the reversely sloped portion 6a provided in adjacent to the respective light incident surfaces 2.

In these modified examples, it is needles to say that the light emitting direction correcting element can be employed. (not shown). There can be employed an arrangement that a light source element is disposed on a portion where a concave or a hollow is formed on the light scattering guide.

Figure 12:
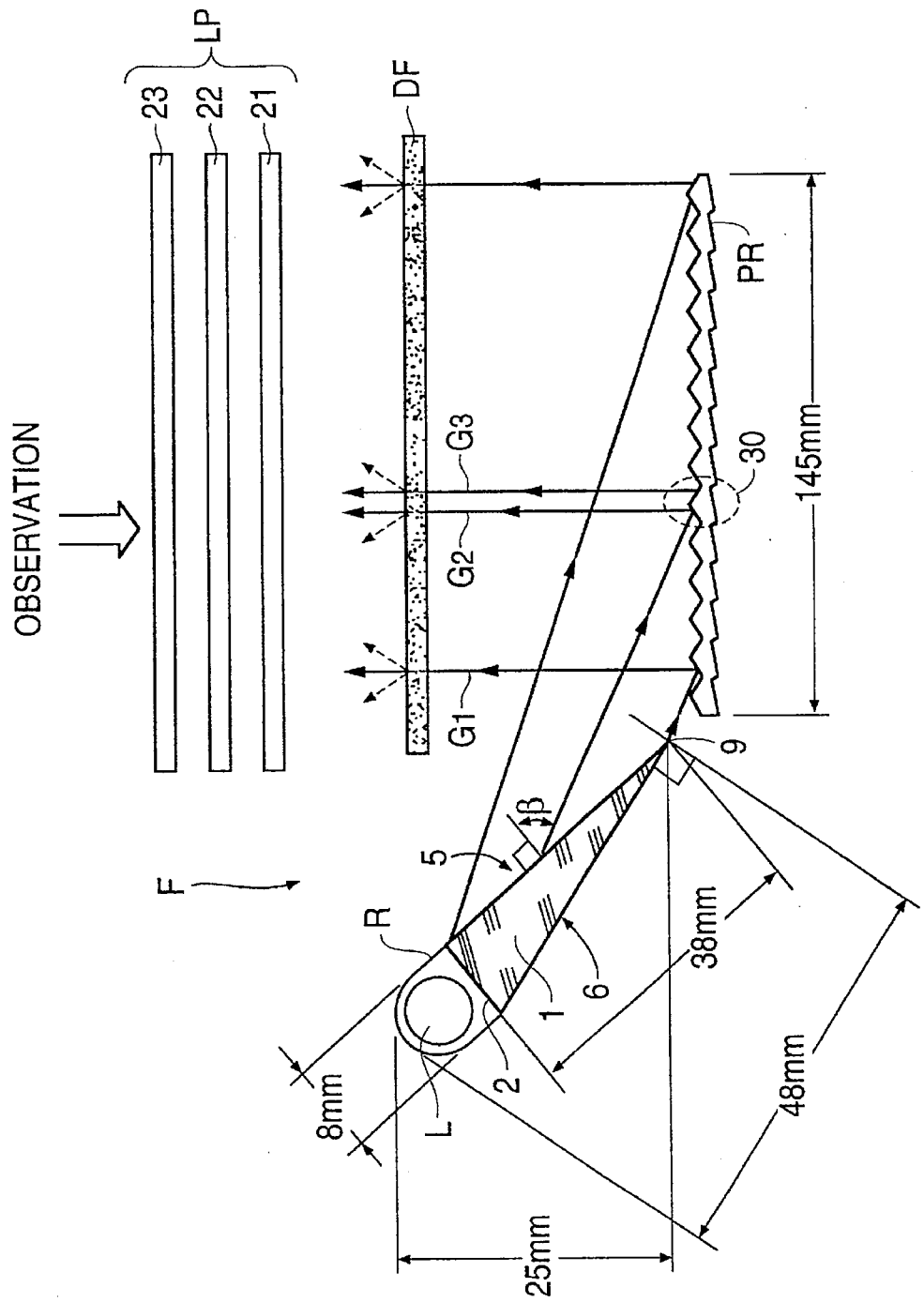
FIG. 12 is a sectional view of essentials of an embodiment in which a surface light source device in a basical arrangement in the first aspect of the invention is used as a backlight source of a liquid crystal display.

FIG. 12 a sectional view of essentials showing one embodiment in a second aspect of the invention, where a surface light source device provided with a basical structure in the second aspect of the invention is used as a backlight of the liquid crystal display. Also in the drawing, for easier understanding of an enlarged function, actual dimensional data are exemplified together therewith. In FIG. 12, a portion shown by symbol F is a parallel light flux emitting section, which is formed of a fluorescent lamp L, a reflector R provided so as to surround the fluorescent lamp L from back surface-side, and a parallelized light flux element 1. The parallelized light flux element 1 is formed of a light scattering guide having a wedge shaped sectional view, where the material in which a rate of 0.1 wt % of silicone series resin material (refractive index=1.4345) is diffused into polymethylmethacrylate (PMMA) is used.

The shape of the parallelized light flux element 1, in general with respect to at least a part thereof, has a tendency that a thickness along a vertical direction to the light output surface decreases with the increase of distance from the light incident surface as viewed from the light incident surface side. The wedge Shape in the present embodiment is a typical configuration thereof. As for the parallelized light flux element 1, a concept of the first aspect of the invention may preferably be applied. In such case, the same reflective appearance prevention section as shown in FIGS. 6 and 10 is provided on the parallelized light flux element 1 formed of the light scattering guide. For example, the reversely sloped portion is formed in the vicinity of the light incident surface 2 on the back surface 6.

The length of the back surface 6 is equal to 38 mm as shown in the drawing, an end of the incident surface 2 side has a thickness of 8,0 mm. The thickness of an end 9 is around 0.2 mm. The width may preferably be a suitable value (for example, 200 mm).

The fluorescent lamp L is arranged 1 mm separated from the incident surface 2 of the parallelized light flux element 1, the diameter thereof 8 mm, the length substantially equal to that of the parallelized light flux element 1. The reflector R is adapted to be arranged so that a light amount incident from the incident surface 2 is made increased as much as possible, and for example, silver foil subjected to its surface treatment for preventing oxidation is used.

The reflector of a regular reflection property is provided also on the back surface 6 of the parallelized light flux element 1. This reflector 3 may preferably be a reflection member in a unitary body (for example, silver foil) with the parallelized light flux element 1, or a reflection film (for example, Ag vapor deposit film, Al vapor deposit film etc) formed on the back surface 6. When using a reflection member having a possibility to be deteriorated of its reflection property due to ultra-violet ray as is the case of silver foil sheet, then an adhesive agent with an ultraviolet ray absorption property as a fixing means to the back surface 6 may preferably be utilized. As described later, it is practical to manufacture the parallelized light flux element 1 by the injection molding technique for plastic material, the in-mold method may preferably be applied on fixing the reflection member.

The emitted light from the fluorescent lamp L and the reflected light by the reflector R enter in the inside of the parallelized light flux element 1 from the light incident surface 2 of the parallelized light flux element 1 formed of the light scattering guide, and while receiving a light scattering operation, light-conducted to the end 9. As described before, through this process, a parallelized light flux (hereinafter referred to as "parallel light flux") is emitted from the light output surface 5 of the parallelized light flux element 1. Symbol G1 depicts a ray representing this parallel light flux. An emitting angle β of the representative ray G1 (this is measured from a vertical line erected on the light output surface 5) comes to approximately 65°.

Symbol PR represents a two side prism reflection element which is arranged, at a specified tilted angle for a propagating direction (that is, a propagating direction of the representative ray G1) of the parallel light flux, on a position which receives a substantially total amount of light of the parallel light flux emitted from the parallel light flux emitting section. The two side prism reflection element PR has a sectional area enlarging function of the parallel light flux and a propagating direction conversion function each described in the following, the substantially total amount of parallel light flux from the parallel light flux emitting section F is reflected upwardly in the drawing.

A light diffusion plate DF has a suitable scattering power is arranged on an optical path of the reflection light flux from the two side prism reflection element PR, and a liquid crystal panel LP formed of liquid crystal display device is arranged further upwardly therefrom. The liquid crystal panel LP includes two sheets of polarizers 21 and 23 allowing polarized transmission axes to orthogonally cross each other and a liquid crystal cell 22 arranged therebetween, as a constituent element of the liquid crystal display device.

In such arrangement, the parallel light flux supplied from the parallel light flux emitting section F is converted into an enlarged reflected light flux which travels upwardly at the two side prism reflection element PR and is incident on the light diffusion plate DF. The light diffusion plate DF suitably relaxes and adjusts a directionality of a reflected light flux of the two side prism reflection element PR, at the same time, is suitably used to remove a brightness irregularity at a fine level having a possibility to be generated on a reflection process in the two side prism reflection element PR. The light diffusion plate DF can be omitted, or replaced by a transparent plate.

The parallel light flux, which has passed through the light diffusion plate DF and has suitably been relaxed and adjusted of its directionality, is incident on the liquid crystal panel LP as a backlight. Due to a directionality and uniformity of the parallel light flux, there can be realized a display picture graded in a display quality as viewed from a desired observing direction (here, a front direction). By adjusting an intensity of the scattering power given to the light diffusion plate DF, a range of the observation direction where a bright display picture is observed can suitably be controlled.

Figure 13:
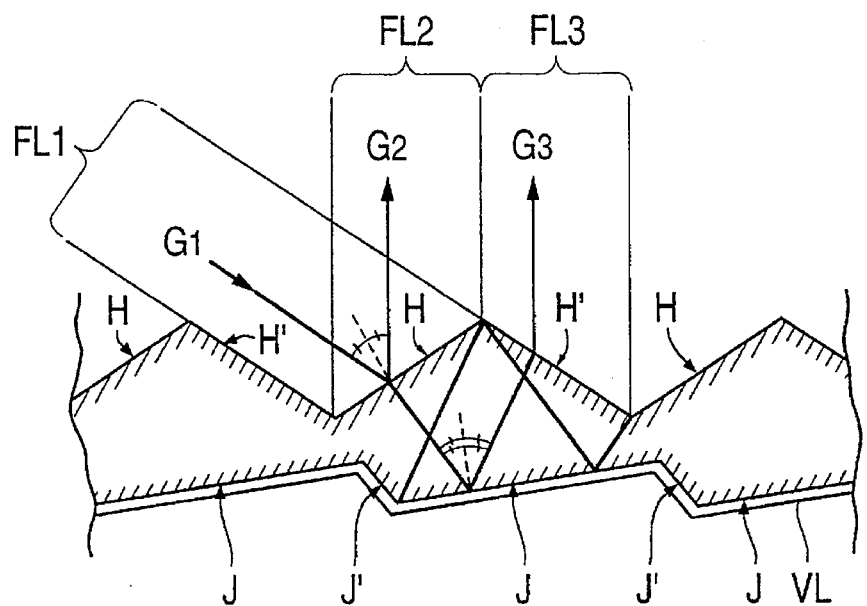
FIG. 13 is a sectional view showing enlarged a part of a two side prism reflection element used in the embodiment shown in FIG. 12 where is described together with a situation of reflection of a parallel light flux FL1 represented by a ray G1.

Next, a construction and function of the two side prism reflection element PR is described. FIG. 13 is an enlarged sectional view of a portion shown by numeral 30 of the two side prism reflection element PR, where is described together with a situation of reflection of a parallel light flux represented by the ray G1. As shown in the drawing, two sides of the two side prism reflection element PF is formed thereon of repeated tilt surfaces H, H', J, J' constituting prism shaped irregularities.

In order to prevent transmission and diffusion of the light, vapor deposit films VL such as Al or Ag or the like are suitably formed. An optional transmissive optical material can be used for a material constituting the two side prism reflection element PR, and the use of the same material as that in a matrix of the parallelized light flux element 1, for example, the use of PMMA (polymethylmethacrylate) are economically advantageous.

It is preferable that the next condition is established between a propagating direction of the representative ray G1 and a tilt angle of tilt surfaces H, H', J, J' on each surface of front and back surfaces. In other words, in order to satisfy this condition, it is preferable to select materials (refractive index) of the parallelized light flux element 1 and the two side prism reflection element PR, a behavior relationship between the parallelized light flux element 1 and the two side prism reflection element PR, and a tilt angle of the tilt surfaces H, H', and J, J'.

(1) Propagating directions of each tilted surface H' and the ray G1 are in parallel with each other.

(2) Each tilt surface J extends to a position which receives a substantially total amount of refracted light flux incident from H.

(3) Each tilt surface H' extends to a position which receives the substantially total amount of regular reflection light flux in a surface J (a boundary face with a vapor deposit film) of the refracted light flux incident from each tilt surface H.

(4) The ray G2 and a ray G3 which respectively represent the regular reflection light flux FL2 in each tilted surface H and a light flux FL3 emitted from each tilt surface H' are in parallel with each other, and is substantially in conformity with a desired emitting direction.

It is difficult to always strictly satisfy the condition described above. However, an approximated satisfactory result can be obtained within a range in that at least a desired emitting direction is not largely shifted from the front direction. For example, by adjusting a behavior for the parallelized light flux element 1 of the two side prism reflection element PR and only by selecting a refractive index of the two side prism reflection element PR, then an emitting direction can be controlled at a satisfactory width range.

Preferably, through a reflective operation in two sides of the two side prism reflection element PR which is designed to satisfy the condition described above, the incident light flux FL1 represented by the ray G1 is divided into a regular reflection light flux FL2 (represented by G2) in each surface H and a refractive emitting light flux FL3 (represented by G3) from each surface H', its sectional area is enlarged (FL1 _FL2+FL3). To adjust a rate of reflection/transmission in each surface H, it is considered that a semi-transmission film is formed on each surface H.

In case where a difference of rates of reflection/transmission in each surface H of polarized component (P polarized component and S polarized component) appears as a brightness irregularity on the liquid crystal display surface, it is effective to reduce a repeating pitch of the repeated tilt H, H', J, J' and to enhance a scattering power given to the light diffusion plate DF.

The argument in the present embodiment as described above is mainly to attention a longitudinal direction (a direction along the paper surface, hereinafter referred to simply as "longitudinal direction") as viewed from the light incident surface 2 of the parallelized light flux element 1. For a transverse direction (a vertical direction to the paper surface, hereinafter referred to simply as "transverse direction") as viewed from the light incident surface 2 of the parallelized light flux element 1, in case where it is desired to adjust a propagating direction of the light flux and to prevent diffusion of the light to a lateral side of the transverse direction of the surface light source device, then the light emitting direction correcting means is provided facing the light output surface 5 of the parallelized light flux element 1.

Figure 14:
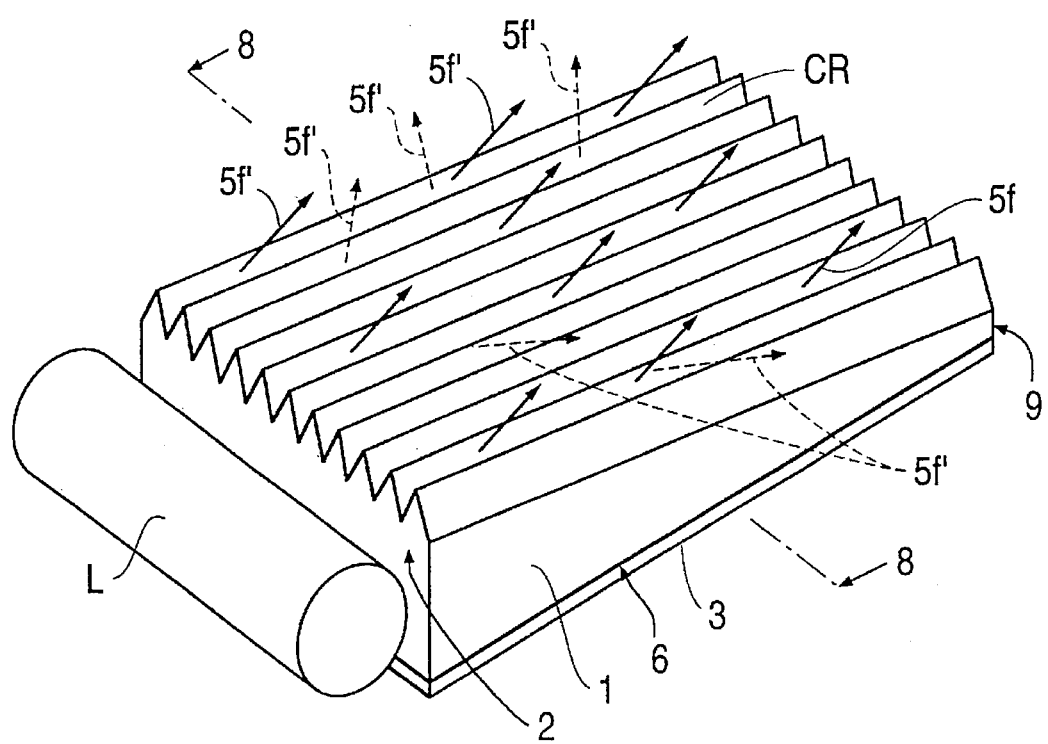
FIG. 14 is a perspective view illustrating a light emitting direction correcting means provided unitarily with a parallelized light flux element in a second aspect of the invention.

The light emitting direction correcting means may preferably be provided in either manner of a unitary form with the parallelized light flux element 1 or a separated form with the same. FIG. 14 is a perspective view showing an example of the former, and FIG. 15 is a perspective view showing an example of the latter.

In each drawing, symbols CR and CR' are a prism shaped irregularity line formed by being aligned in a transverse direction to the light output surface 5 side of the parallelized light flux element 1. In an example shown in FIG. 14, such is simultaneously used by a surface of the light output surface 5 of the parallelized light flux element 1. In an example shown in FIG. 15, a modified example is shown wherein the light emitting direction correcting element 7 which is a separated body forming the irregularity CR' is arranged.

Numerals 2, 3, 4, 5 depict a light incident surface, a reflector (silver foil), a light output surface, and a back surface as in FIG. 12, respectively.

Figure 15:
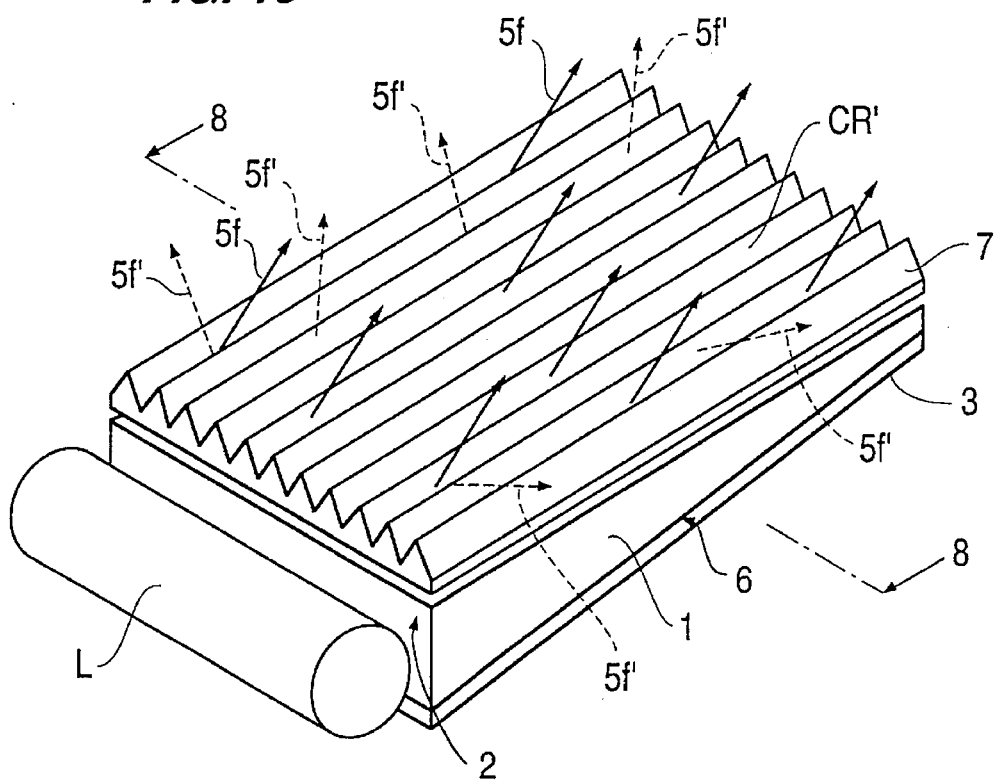
FIG. 15 is a perspective view illustrating a light emitting direction correcting means (a light emitting direction correcting element) provided in separated form with a parallelized light flux element in the second aspect of the invention.

In both arrangements in FIGS. 14 and 15, a light entering into the parallelized light flux element 1 from the light incident surface 2 is parallelized in the longitudinal direction by the reason as formerly described, and emitted from the light output surface 5 at an emitting angle of approximately 65 degree (expressed by arrow group 5f).

In consideration of a way of light traveling in a transverse direction on emitting, a noticeable spread in the propagating direction is considered to be present by the scattering power given to the parallelized light flux element 1 (expressed by arrow group 5f').

The prism shaped irregularity line in each drawing formed by aligning in the longitudinal direction, suppresses such spread in the light flux propagating direction in the transverse direction, and improves a paralleling property in three dimensional manner of the light, and through this operation, the light diffusion in lateral side of the transverse direction is effectively prevented.

Figure 16:
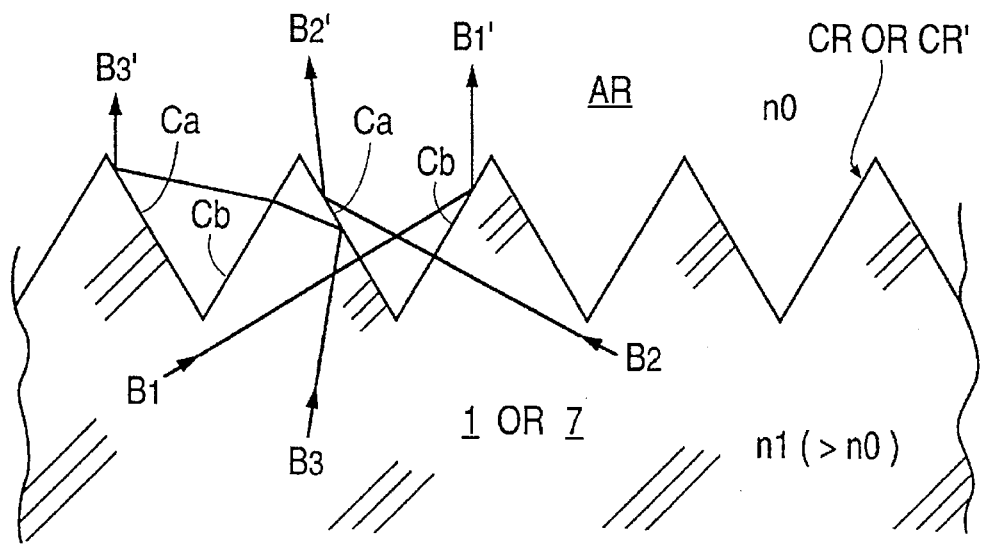
FIG. 16 is an illustrative view illustrating a light emitting direction correcting function of a light emitting direction correcting means shown in FIGS. 14 and 15.

FIG. 16 is an illustrative view of a light emitting direction correcting function in a transverse direction in each drawing, showing a sectional view obtained by cutting, along a direction shown by numeral 8, a parallelized light flux element 1 or a light emitting direction correcting element 7. In the drawing, a ray having fluctuation in a direction shown by numerals B1 to B3 represents a light immediately before being emitted to the external from the parallelized light flux element 1 or the light emitting direction correcting element 7.

The rays B1 and B2 having a traveling direction approximating a right and left direction is, as shown in the drawing, emitted temporarily to the air layer AR from oneside of prism surfaces Ca and Cb constituting the irregularity surface CR or CR'. Its corresponding portions are regular reflected by the other prism surfaces Cb and Ca, to be removed of its transverse direction component, and to be emitted as rays B1' and B2'.

On the other hand, the ray B3 lack of the transverse direction component is, as shown in the drawing, reflected on one-side prism surface Ca, and then passes through the other prism surface Cb, and once emitted to the air layer AR. The corresponding portion is regular reflected on an adjacent prism surface Ca, and emitted as a ray B3' maintaining its status lack of the transverse direction component. Due to such refractive operation, a rate of the light, which is propagated in a direction as shown by arrow mark group f5 in FIGS. 14 and 15, is increased, and a rate of the light, which is shifted to lateral side of the transverse direction as shown by arrow mark group 5f', is decreased.

As a consequence, a paralleling degree of the light flux supplied from the parallelized light flux emitting section F is three dimensionally improved.

When using an ordinary material (for example, PMMA) for the parallelized light flux element 1 or the light emitting direction correcting element 7, a largeness of a prism vertical angle (an angle formed by prism surfaces Ca and Cb) suitable for satisfactorily exhibiting the light emitting direction correcting function is around 80° to 110°.

In each embodiment as described, a rod shaped fluorescent lamp is used as a light source. However, it is apparent from a principle of the invention and the explanations as hereinbefore described that the invention is not limited to such kinds and shapes of the light sources. For example, according to the invention, a light of the surface light source of a light diffusion property may preferable be incident from the light incident surface of the parallelized light flux element. In addition to the above, according to the invention, a plurality of beams from the light emitting diode array are made an incident light which can be converted into a uniform parallel light flux.

Furthermore, an arrangement in FIG. 12 may preferably be made a parallel alignment opposing each other to produce substantially a twice sized enlarged light flux as a surface light source device using two lamps.

Finally, material and manufacturing method for the light scattering guide used in the invention will be described.

In a matrix which is a base of the light scattering guide used in the invention, various kinds of polymers are utilized. The representative ones include, as shown in Tables 1 and 2, PMMA (polymethacrylate), PSt (polystyrene), and PC (polycarbonate) and the like.

TABLE 1

| category | name of polymer | refractive index |
|---|---|---|
| MA | 1. PMKA [polymethyl methacrylate] | 1.49 |
| | 2. PEMA [polyethyl methacrylate] | 1.483 |
| | 3. Poly(nPMA) [poly-n-propyl methacrylate] | 1.484 |
| | 4. Poly(nBMA) [poly-n-butyl methacrylate] | 1.483 |
| | 5. Poly(nHMA) [poly-n-hexyl methacrylate] | 1.481 |
| | 6. Poly(iPMA) [polyisopropyl methacrylate] | 1.473 |
| | 7. Poly(iBMA) [polyisobutyl methacrylate] | 1.477 |
| | 8. Poly(tBMA) [poly-t-butyl methacrylate] | 1.463 |
| | 9. PCHMA [polycyclohexyl methacrylate] | 1.507 |
| XMA | 10. PBzMA [polybenzyl methacrylate] | 1.568 |
| | 11. PPhMA [polyphenyl methacrylate] | 1.57 |
| | 12. Poly(1-PhEMA) [poly-1-phenylethyl methacrylate] | 1.543 |
| | 13. Poly(2-PhEMA) [poly-2-phenylethyl methacrylate] | 1.559 |
| | 14. PFFMA [polyfurfuryl methacrylate] | 1.538 |
| A | 15. PMA [polymethyl acrylate] | 1.4725 |
| | 16. PEA [polyethyl acrylate] | 1.4685 |
| | 17. Poly(nBA) [poly-n-butyl acrylate] | 1.4535 |
| XA | 18. PBzMA [polybenzyl acrylate] | 1.5584 |
| | 19. Poly(2-ClEA) [Poly-2-chloroethyl acrylate] | 1.52 |

TABLE 2

| category | name of polymer | refractive index |
| --- | --- | --- |
| AC | 20. PVAc [Polyvinyl acetate] | 1.47 |
|  | 21. PVB [polyvinyl benzoate) | 1.578 |
|  | 22. PVAc [polyvinyl phenyl acetate] | 1.567 |
|  | 23. PVC1Ac [polyvinyl chloroacetate] | 1.512 |
| N | 24. PAN [polyacrylonitrile] | 1.52 |
|  | 25. Poly(αMAN) [poly-α-methyl acrylonitrile] | 1.52 |
| α-A | 26. PMA(2Cl) [polymethyl-α-chloroacrylate] | 1.5172 |
| St | 27. Poly(o-C1St) [poly-o-chlorostyrene] | 1.6098 |
|  | 28. Poly(p-FSt) [poly-p-fluorostyrene] | 1.566 |
|  | 29. Poly(o, p-FSt) [poly-o-, p-diflurostyrene] | 1.475 |
|  | 30. Poly(p-iPSt) [poly-p-isopropyl styrene] | 1.554 |
|  | 31. PSt [polystyrene] | 1.59 |
| C | 32. PC [polycarbonate] | 1.59 |

The light scattering guide mainly made of such polymer materials is manufactured by the following producing method.

First of all, one method is to utilize a molding process including kneading two or more kinds of polymers.

In detail, the polymer materials of equal to or more than two kinds having different refractive indices with each other (An optional shape is available. For example, a pellet shape is considered in industrial view.) are mixed and heated to be kneaded (a kneading process), thus kneaded liquid phase material is high pressure injected into a metallic die to be cooled and solidified for molding, a light scattering guide thus molded is taken out from the metal die, consequently the light scattering guide with a shape corresponding to the metal die shape can be produced.

For example, the metal die whose one end with a thicker thickness of a wedge shape is made a reverse tilt portion is used, thus, the light scattering guide 1 used in the arrangement in FIG. 6 is produced. In addition, the inside surface of the metal die of the reverse tilt portion is made a roughened surface (crimped face), then the reverse tilt portion 6a of the light scattering guide 1 can be made the rough surface (crimped face).

The kneaded two kinds or more of different refractive index polymers are solidified without being completely mixed, an irregularity (a fluctuation) in a local concentration thereof arises to achieve fixing, thereby a uniform scattering power is produced.

The kneaded material is injected into a cylinder protrusion molding machine, and protruded by the ordinary procedure, where a molded product to be an object is obtained.

A good amount of selection is available for a rate combination or mixture of those polymers, which may preferably be determined in consideration of a difference of refractive index, and a strength or nature of the refractive index ununiformity structure produced in the molding process (a scattering irradiation parameter E, correlation distance "a", and dielectric constant fluctuation root-mean-square t etc). Available representative polymers to be used are shown in Tables 1 and 2.

Another method of manufacturing materials constituting the light scattering guide is that particle shaped materials having different refractive indices (a difference of refractive index equal to or more than 0.001) of refractive indices are uniformly mixed and dispersed into the polymer materials.

One method available for uniformly mixing the particle shaped materials includes a suspension polymerization method. The particle shaped materials are mixed into monomer, and thus resultant is suspended into hot water, where polymerization reaction is allowed to generate, polymer in which the particle shaped materials are uniformly mixed can be obtained. This used to an original material and molded, thereby the desired shaped light scattering guide is manufactured.

The light scattering guides having various characteristics can be manufactured in way that the suspension polymerization is executed for various combinations of the particle shaped materials and monomers (combinations of particle concentrations, particle sizes, and refractive indices or the like), a plurality of kinds of materials thus produced and prepared are selectively blended to be molded. When the polymers without including particle shaped material are blended, a particle concentration can readily be controlled.

Further another method used for uniform mixture of the particle shaped materials is to knead polymer materials and particle materials. Also in this case, combinations of various particle shaped materials and polymers (combinations of particle concentrations, particle sizes, and refractive indices and the like) are kneaded and molded (pelletization), those resultants are selectively blended and molded to produce the light scattering guide, whereby the light scattering guides having various characteristics can be manufactured.

It is furthermore available to combine the polymer blend method and the particle shaped material mixture method. For example, a blend of the different refractive index polymers/mixture of the particle shaped material during kneading are considered.

Next, some of concrete examples of methods of manufacturing light scattering guides will be described. A configuration of the light scattering guide to be manufactured is made one used in FIG. 6, having a height 68 mm, a width 85 mm, the thickest thickness (a boundary portion of 6a and 6b) 3.8 mm, the thinnest thickness 0.2 mm, at the light incident surface 2 lateral end portion 1.9 mm.

Manufacturing Example 1

An amount 0.3 wt % of silicon series resin powders with a particle size 0.8 μm (Toshiba Silicone Co., Ltd.; TOOPE-ARL 108) are added to methacryl resin pellet (Asahi Chemical Industry Co., Ltd.; DELVET), and mixed and dispersed by a mixer, thereafter protruded into an strand shape by a protrusion machine, further pelletized by a pelletizer, thereby a pellet in which the silicon series resin powders are uniformly dispersed is prepared.

Thus produced pallet is molded by the injection molding machine under the condition of a cylinder temperature 230° C. to 260° C., a die temperature 50° C., whereby a light scattering guide used in an arrangement in FIG. 6 can be obtained.

A correlation distance "a" of thus manufactured light scattering guide satisfies a=0.53 μm, the effective scattering irradiation parameter E which is an estimated calculation value by the equation (11) was E=12.6 [cm$^{-1}$].

Manufacturing Example 2

The 0.3 wt % of silicone series resin powders with a particle size 0.8 μm (Toshiba Silicone Co., Ltd.; TOSPEARL 108) is added to MMA, and by the known suspension polymerization method, spherical shaped particles where the powders are uniformly dispersed have been obtained. The resultant is pelletized by the pelletizer as is the case of the manufacturing example 1, thereby a pellet in which the silicone series resin powders are uniformly dispersed have been produced.

Hereinafter, the same type of plate shaped light scattering guide can be obtained under the same condition as in the manufacturing example 1. This light scattering guide is entirely difficult to be distinguished in external view with the light scattering guide produced in the manufacturing example 1, where a correlation distance satisfies a=0.53 μm, the estimated value of the effective scattering irradiation parameter E by the equation (11) satisfies E=12.6 [cm$^{-1}$].

Manufacturing Example 3

The 0.5 wt % of polystyrene (PSt) is added to polymethyl methacrylate (PMMA), the resultant is mixed in 10 minutes using a V type tumbler, and then mixed in 5 minutes using Henscher mixer. Further the resultant is melted and mixed by a two axis protrusion machine with a diameter 30 mm (Nakanati Machine Co., Ltd) under the condition of a cylinder temperature 220° C. to 250° C., a screw rotative speed 75 rpm, and a discharging rate 6 kg/hr, thereby a pellet is produced.

This pellet is molded by an injection molding machine under the condition of a cylinder temperature 220° C. to 250° C., a mold temperature 65° C., an injection speed of an intermediate speed, and a injection pressure of short shot pressure plus 10 kg/cm$^2$, then a light scattering guide with a shape used in an arrangement in FIG. 6 is obtained.

Manufacturing Example 4

Each 0.05 wt %, 0.08 wt %, 0.10 wt % and 0.15 wt % of silicon series resin powders (Toshiba Silicone Co., Ltd.; TOSPEARL 108) with a particle size 2 μm is added and uniformly dispersed into MMA (methylmethacrylate), and consequently four kinds of test materials and particle non-added MMA test material are prepared, thus a total of five kinds of test materials each are added 0.5 wt % of benzylperoxide (BPO) as a radical polymerization start agent and 0.2 wt % of n-laurylmercaptan (n-LM) as a chain transfer agent, and are casting-polymerized in 24 hours at 70° C., thereby obtaining a light scattering guide with a shape used in an arrangement in FIG. 6.

Manufacturing Example 5

The 0.025 wt % of silicone oil is added and uniformly dispersed into MMA (methylmethacrylate), the resultant is further added with 0.5 wt % of benzylperoxide (BPO) as a radical polymerization agent and 0.2 wt % of n-butylmercaptan (n-BM) as a chain transfer agent respectively, and is processed of conversion into sol in 30 minutes at 70° C., further casting-polymerized in 24 hours at 65° C., as a consequence, there can be obtained a light scattering guide with the same type and dimension as in the manufacturing examples 1 to 4.

The light scattering guide constituting the parallelized light flux element used in the arrangement in FIG. 12, also is manufactured by the same method as in the manufacturing examples as described. A shape and dimension of the light scattering guide may optionally be determined depending on a shape and size of a metal die to be used.

Advantages according to the invention as hereinbefore described are summarized as follows.

(1) In the first aspect according to the invention, in the surface light source device utilizing the light scattering guide whose thickness tends to decrease with an increased distance from the light incident surface, reflective appearance of the light supply means arisen in the vicinity of the light incident surface is readily prevented. In detail, in the surface light source device of the invention, a brightness irregularity is reduced over the entire light output surface including the light output surface in adjacent to the light incident surface, there can thus be avoided the status in that the light output surface region with a practical availability is reduced. Moreover, when such surface light source device is applied to the backlight of the liquid crystal display, there can be obtained a liquid crystal display having a high display quality over the whole relatively larger display surface with a high power saving property resulting in a higher practical-utilization efficiency of light.

(2) In the first aspect of the invention, even in case where the reflection means of a regular reflection property is disposed on back surface-side of the light output surface of the light scattering guide, and/or in case where an arrangement of providing the light emitting direction correcting means facing the light output surface is selected, the reflective appearance of the light source is prevented without deteriorating advantages which those arrangement/construction possess.

(3) Such advantages improve a display performance and an electric power saving property of the liquid crystal display monitors such as video cameras, personal computers, and liquid crystal televisions, and the like.

(4) In the second aspect of the invention, there can be achieved at the same time a parallelization and an enlargement of the light flux having a random directionality, which have hardly be obtained by the conventional method of using the lenses or curved surface mirror. The parallelized light flux obtained in such case has a sectional view with a high flatness degree of a strength profile.

(5) In addition, in the second aspect of the invention, a technical means for improving a paralleling degree relating to a transverse direction viewed from the light incident surface is provided, then the light flux with non-parallel property can be converted into the enlarged light flux having a high parallel property in the three dimensional meaning.

Therefore, using a relatively smaller type of parallelized light flux element, the surface light source deice capable of producing the parallel light flux with a larger sectional area can be constituted.

(6) The present invention is, through these advantages, easily applicable to the video cameras, personal computers, and liquid crystal televisions and the like each having the liquid crystal displays with a larger picture surface and a high display quality.

What is claimed is:

1. A surface light source device comprising:
   a light supply means; and
   a light scattering guide comprising:
      a light incident surface region positioned in the vicinity of the light supply means for receiving light from the light supply means;
      a light output surface region for emitting light received at the light incident surface region;
      a volume region having a uniform scattering power, the volume region having a back side opposite the light output surface region, and first and second portions, the first portion having a thickness extending inward from the light output surface region to the back side, which decreases with increasing distance from the light incident surface region such that in the first portion, the back side has a first slope with respect to the light output surface region; and
      reflective appearance prevention means for preventing a reflective appearance from the light supply means, formed in the second portion of the volume region closer to the light incident surface region than the first portion, the second portion having a thickness which increases, decreases or remains the same with increasing distance from the light incident surface region such that in the second portion, the back side has a second slope with respect to the light output surface region which is less than the first slope.

2. A surface light source device as claimed in claim 1, further comprising light reflection means having a regular reflection property, disposed on the back side opposite the light output surface region of the light scattering guide.

3. A surface light source device as claimed in claim 1, further comprising scattering light emitting direction correcting means for correcting an emitting direction, disposed on the light output surface region of the light scattering guide, as a separate structure from the light scattering guide.

4. A surface light source device as claimed in claim 1, further comprising scattering light emitting direction correcting means for correcting an emitting direction, disposed on the light output surface region of the light scattering guide, as a unitary structure with the light scattering guide.

5. A surface light source device as claim 1, further comprising:
scattering light emitting direction correcting means for correcting an emitting direction, disposed on the light output surface region of the light scattering guide as a separate structure from the light scattering guide; and
light reflection means having a regular reflection property, disposed on the back side opposite the light output surface region of the light scattering guide.

6. A surface light source device as claim 1, further comprising:
scattering light emitting direction correcting means for correcting an emitting direction, disposed on the light output surface region of the light scattering guide as a unitary structure with the light scattering guide; and
light reflection means having a regular reflection property, disposed on the back side opposite the light output surface region of the light scattering guide.

7. A liquid crystal display comprising:
a light supply means;
a light scattering guide comprising:
a light incident surface region positioned in the vicinity of the light supply means for receiving light from the light supply means;
a light output surface region for emitting light received at the light incident surface region;
a volume region having a uniform scattering power, the volume region having a back side opposite the light output surface region, and first and second portions, the first portion having a thickness extending inward from the light output surface region to the back side, which decreases with increasing distance from the light incident surface region such that in the first portion, the back side has a first slope with respect to the light output surface region;
reflective appearance prevention means for preventing a reflective appearance from the light supply means, formed in the second portion of the volume region closer to the light incident surface region than the first portion, the second portion having a thickness which increases, decreases or remains the same with increasing distance from the light incident surface region such that in the second portion, the back side has a second slope with respect to the light output surface region which is less than the first slope; and
a liquid crystal device arranged in a position to receive light emitted from the light output surface region.

8. A liquid crystal display as claimed in claim 7, further comprising light reflection means, provided on the back side opposite the light output surface region of the light scattering guide.

9. A liquid crystal display as claimed in claim 7, further comprising scattering light emitting direction correcting means for correcting an emitting direction, disposed on the light output surface region of the light scattering guide, as a separate structure from the light scattering guide.

10. A liquid crystal display as claimed in claim 7, further comprising scattering light emitting direction correcting means for correcting an emitting direction, disposed on the light output surface region of the light scattering guide, as a unitary structure with the light scattering guide.

11. A liquid crystal display as claimed in claim 7, further comprising scattering light emitting direction correcting means for correcting an emitting direction, disposed on the light output surface region of the light scattering guide, as a separate structure from the light scattering guide; and light reflection means, disposed on the back side opposite the light output surface region of the light scattering guide.

12. A liquid crystal display as claimed in claim 7, further comprising scattering light emitting direction correcting means for correcting an emitting direction, disposed on the light output surface region of the light scattering guide, as a unitary structure with the light scattering guide; and light reflection means, provided on the back side opposite the light output surface region of the light scattering guide.

13. A surface light source device comprising:
a light supply means;
a parallelized light flux element comprising:
a light incident surface region positioned in the vicinity of the light supply means for receiving light from the light supply means;
a light output surface region for emitting as parallel light, light received at the light incident surface region;
a volume region having a uniform scattering power expressed by a correlation function $\gamma(r)$ approximated by $\exp(-r/a)$, where r is a distance between two points in said volume region and a is a correlation distance whose value lies in a range of 0.06 $\mu m \leq a \leq 35$ $\mu m$, the volume region having an effective scattering illumination parameter E whose value lies in a range of 0.5 $cm^{-1} \leq E \leq 50$ $cm^{-1}$, the volume region having, at least in a part thereof, a thickness extending inward from the light output surface region to an opposing side, which decreases with increasing distance from the light incident surface region; and
a two sided prism reflection element extending in a reflection plane which is at an angle to the light output surface region of the parallelized light flux element such that the parallelized light flux element does not cross the reflection plane, the reflection element receiving the parallel light from the light output surface region at a first angle to the reflection plane and emitting parallel light at a second angle, different from the first angle, to the reflection plane.

14. A surface light source device comprising:
a light supply means;
a parallelized light flux element comprising:
a light incident region positioned in the vicinity of the light supply means for receiving light from the light supply means;
a light output surface region for emitting as parallel light, light received at the light incident surface region;
a volume region having a uniform scattering power expressed by a correlation function $\gamma(r)$ approximated by $\exp(-r/a)$, where r is a distance between two points in said volume region and a is a correlation distance whose value lies in a range of 0.06 $\mu m \leq a \leq 35$ $\mu m$, the volume region having an effective scattering illumination parameter E whose value lies in a range of 0.5 cm$^{-1}$≦50 cm$^{-1}$, the volume region having, at least in a part thereof, a thickness extending inward from the light output surface region to an opposing side, which decreases with increasing distance from the light incident surface region;

a two sided prism reflection element extending in a reflection plane which is at an angle to the light output surface region of the parallelized light flux element such that the parallelized light flux element does not cross the reflection plane, the reflection element having a reflection surface having surface portions which are angled with respect to one another, in a repeated tilt configuration such that the surface portions define a plurality of sets of parallel planes, the reflection element receiving the parallel light from the light output surface region at a first angle to the reflection plane and emitting parallel light at a second angle, different from the first angle, to the reflection plane; and a light diffusion plate in an optical path of light emitted from the two sided prism reflection element.

15. A surface light source device as claimed in claim 13, or 14, further comprising light emitting direction correcting means for correcting an emitting direction of the parallel light so that the parallel light is received at the two sided prism element at the first angle, the light emitting direction correcting means being disposed on the light output surface region of the parallelized light flux element.

16. A surface light source device as claimed in claim 13 or 14, further comprising reflecting prevention means for preventing a reflective appearance from the light supply means, formed in the volume region adjacent to the light incident surface region, on the side opposing the light output surface region.

17. A liquid crystal display comprising:

a light supply means;

a parallelized light flux element comprising:
   a light incident surface region positioned in the vicinity of the light supply means for receiving light from the light supply means;
   a light output surface region for emitting as parallel light, light received at the light incident surface region;
   a volume region having a uniform scattering power expressed by a correlation function γ(r) approximated by exp (−r/a), where r is a distance between two points in said volume region and a is a correlation distance whose value lies in a range of 0.06 μm≦a≦35 μm, the volume region having an effective scattering illumination parameter E whose value lies in a range of 0.5 cm$^{-1}$≦E≦50 cm$^{-1}$, the volume region having, at least in a part thereof, a thickness extending inward from the light output surface region to an opposing side, which decreases with increasing distance from the light incident surface region;

a two sided prism reflection element extending in a reflection plane which is at an angle to the light output surface region of the parallelized light flux element such that the parallelized light flux element does not cross the reflection plane, the reflection element receiving the parallel light from the light output surface region at a first angle to the reflection plane and emitting parallel light at a second angle, different from the first angle, to the reflection plane; and a liquid crystal device arranged in a position to receive light emitted from the light output surface region.

18. A liquid crystal display comprising:

a light supply means;

a parallelized light flux element comprising:
   a light incident region positioned in the vicinity of the light supply means for receiving light from the light supply means;
   a light output surface region for emitting as parallel light, light received at the light incident surface region;
   a volume region having a uniform scattering power expressed by a correlation function γ(r) approximated by exp (−r/a), where r is a distance between two points in said volume region and a is a correlation distance whose value lies in a range of 0.06 μm≦a≦35 μm, the volume region having an effective scattering illumination parameter E whose value lies in a range of 0.5 cm$^{-1}$≦E≦50 cm$^{-1}$, the volume region having, at least in a part thereof, a thickness extending inward from the light output surface region to an opposing side, which decreases with increasing distance from the light incident surface region;

a two sided prism reflection element extending in a reflection plane which is at an angle to the light output surface region of the parallelized light flux element such that the parallelized light flux element does not cross the reflection plane, the reflection element having a reflection surface having surface portions which are angled with respect to one another, in a repeated tilt configuration such that the surface portions define a plurality of sets of parallel planes, the reflection element receiving the parallel light from the light output surface region at a first angle to the reflection plane and emitting parallel light a second angle, different from the first angle, to the reflection plane;

a light diffusion plate in an optical path of light emitted from the two sided prism reflection element; and a liquid crystal device arranged in a position to receive light emitted from the two sided prism reflection element after the light passes through the light diffusion plate.

19. A liquid crystal display as claimed in claim 17, or 18, further comprising light emitting direction correcting means for correcting art emitting direction of the parallel light so that the parallel light is received at the two sided prism element at the first angle, the light emitting direction correcting means being disposed on the light output surface region of the parallelized light flux element.

20. A liquid crystal display as claimed in claim 17 or 18, further comprising reflecting prevention means for preventing a reflective appearance from the light supply means, formed in the volume region adjacent to the light incident surface region, on the side opposing the light output surface region.

* * * * *